US012434496B2

United States Patent
(12) United States Patent
Ono

(10) Patent No.: US 12,434,496 B2
(45) Date of Patent: Oct. 7, 2025

(54) PRINTER SYSTEM

(71) Applicant: DAI NIPPON PRINTING CO., LTD., Tokyo (JP)

(72) Inventor: Katsuhisa Ono, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 47 days.

(21) Appl. No.: 18/549,970

(22) PCT Filed: May 11, 2022

(86) PCT No.: PCT/JP2022/019999
§ 371 (c)(1),
(2) Date: Sep. 11, 2023

(87) PCT Pub. No.: WO2022/244666
PCT Pub. Date: Nov. 24, 2022

(65) Prior Publication Data
US 2024/0174009 A1 May 30, 2024

(30) Foreign Application Priority Data
May 17, 2021 (JP) ................................ 2021-083443

(51) Int. Cl.
*B41J 15/04* (2006.01)
*B41J 29/02* (2006.01)

(52) U.S. Cl.
CPC ............... *B41J 15/04* (2013.01); *B41J 29/02* (2013.01)

(58) Field of Classification Search
CPC ..... B41J 15/04; B41J 29/02; B41J 3/42; B41J 15/16; B41J 29/00; B41J 29/13; H05K 5/02
See application file for complete search history.

(56) References Cited

U.S. PATENT DOCUMENTS

2010/0110134 A1* 5/2010 Ohmura .................. B41J 13/08 347/15
2012/0093559 A1 4/2012 Vanheuverzwijn
(Continued)

FOREIGN PATENT DOCUMENTS

JP 08108530 A * 4/1996 ............ B41J 3/4078
JP H08-108530 A 4/1996
(Continued)

OTHER PUBLICATIONS

International Search Report and Written Opinion (Application No. PCT/JP2022/019999) dated Jun. 14, 2022 (12 pages).
(Continued)

*Primary Examiner* — Douglas X Rodriguez
*Assistant Examiner* — Tracey M McMillion
(74) *Attorney, Agent, or Firm* — BURR PATENT LAW, PLLC

(57) ABSTRACT

[Object] To provide a printer system that can be easily produced by easily assembling a plurality of modules.

[Solution] A printer system 1 includes a plurality of modules 10, 30, and 20 that are coupled to each other. Each of the modules 10, 30, and 20 has a housing 11, 31, or 21 and a coupling body 15, 35, or 25. One of the housing 11, 31, or 21 and the coupling body 15, 35, or 25 has an insertion hole 16, 36, or 26, and the other one of the housing 11, 31, or 21 and the coupling body 15, 35, or 25 has an insertion pin 13, 33, or 23.

12 Claims, 11 Drawing Sheets

(56) References Cited

U.S. PATENT DOCUMENTS

| | | | |
|---|---|---|---|
| 2019/0084321 A1* | 3/2019 | Shigeta | B32B 38/145 |
| 2020/0153988 A1* | 5/2020 | Shiobara | H04N 1/00639 |
| 2022/0274424 A1 | 9/2022 | Kuwabara et al. | |

FOREIGN PATENT DOCUMENTS

| | | |
|---|---|---|
| JP | 2008-044129 A | 2/2008 |
| JP | 2012-081754 A | 4/2012 |
| JP | 2014-024266 A | 2/2014 |
| JP | 2020-075800 A | 5/2020 |
| JP | 2021-053858 A | 4/2021 |
| WO | 2017/175621 A1 | 10/2017 |

OTHER PUBLICATIONS

English translation of the International Preliminary Report on Patentability (Chapter I) dated Nov. 30, 2023 (Application No. PCT/JP2022/019999).

* cited by examiner

PRINTER SYSTEM

TECHNICAL FIELD

The present disclosure relates to a printer system that can be easily assembled by combining a plurality of modules.

BACKGROUND ART

A printer system including a combination of a plurality of modules is known as a dye sublimation printer.

CITATION LIST

Patent Literature

PTL 1: Japanese Unexamined Patent Application Publication No. 2021-53858

SUMMARY OF INVENTION

Technical Problem

However, conventionally, a printer system that makes it possible to easily assemble a plurality of modules and simplify a structure has not been developed.

The present disclosure has been attained in view of such a point, and an object of the present disclosure is to provide a printer system that has a simple structure and can be easily assembled.

Solution to Problem

The present disclosure provides a first printer system including three or more modules that are successively disposed and are coupled to each other, in which a module on an upstream side has a print sheet feeding function of feeding a print sheet, a module on a downstream side has a print sheet winding function of winding the print sheet, another module includes a printer module that performs printing on the print sheet, and each of the modules has a housing and has, on one surface of the housing, a coupling body that protrudes from the one surface and has a smaller size than the housing.

In the first printer system, the present disclosure provides a second printer system in which one of an outer surface of the coupling body and an other surface that is opposed to the one surface of the housing has an insertion hole, and the other one of the outer surface of the coupling body and the other surface has an insertion pin to be inserted into the insertion hole of an adjacent module.

In the first or second printer system, the present disclosure provides a third printer system in which a travelling region where the print sheet travels is formed in a region other than the coupling body between the housings of the modules.

In any one of the first to third printer systems, the present disclosure provides a fourth printer system in which a height of the coupling body of each of the modules is ¼ to ½ of a height of the housing.

In any one of the first to fourth printer systems, the present disclosure provides a fifth printer system in which a width of the coupling body of each of the modules is identical to a width of the housing.

In any one of the first to fifth printer systems, the present disclosure provides a sixth printer system in which a guide path for the print sheet is provided in the travelling region between the housings.

In any one of the first to sixth printer systems, the present disclosure provides a seventh printer system in which the plural other modules are provided and include a cover sheet attachment module that is located on a downstream side relative to the printer module and provides a cover sheet onto the print sheet.

In any one of the first to seventh printer systems, the present disclosure provides an eighth printer system in which a plurality of printer modules are provided as the printer module.

In any one of the first to eighth printer systems, the present disclosure provides a ninth printer system in which a plurality of insertion pins that are arranged in a horizontal direction and a plurality of insertion holes that are arranged in a horizontal direction are provided as the insertion pin and the insertion hole of each of the modules.

In any one of the first to ninth printer systems, the present disclosure provides a tenth printer system in which the one surface and the other surface of the housing of each of the modules has an opening through which the print sheet passes.

In any one of the first to tenth printer systems, the present disclosure provides an eleventh printer system in which a first contact point is provided on one of the outer surface of the coupling body and the other surface of the housing, and a second contact point that is electrically connected to the first contact point of an adjacent module is provided on the other one of the outer surface of the coupling body and the other surface of the housing.

Advantageous Effects of Invention

As described above, according to the present disclosure, a printer system that can be easily assembled by combining a plurality of modules and can simplify an overall structure can be obtained.

DESCRIPTION OF EMBODIMENTS

First Embodiment

Figure 1:
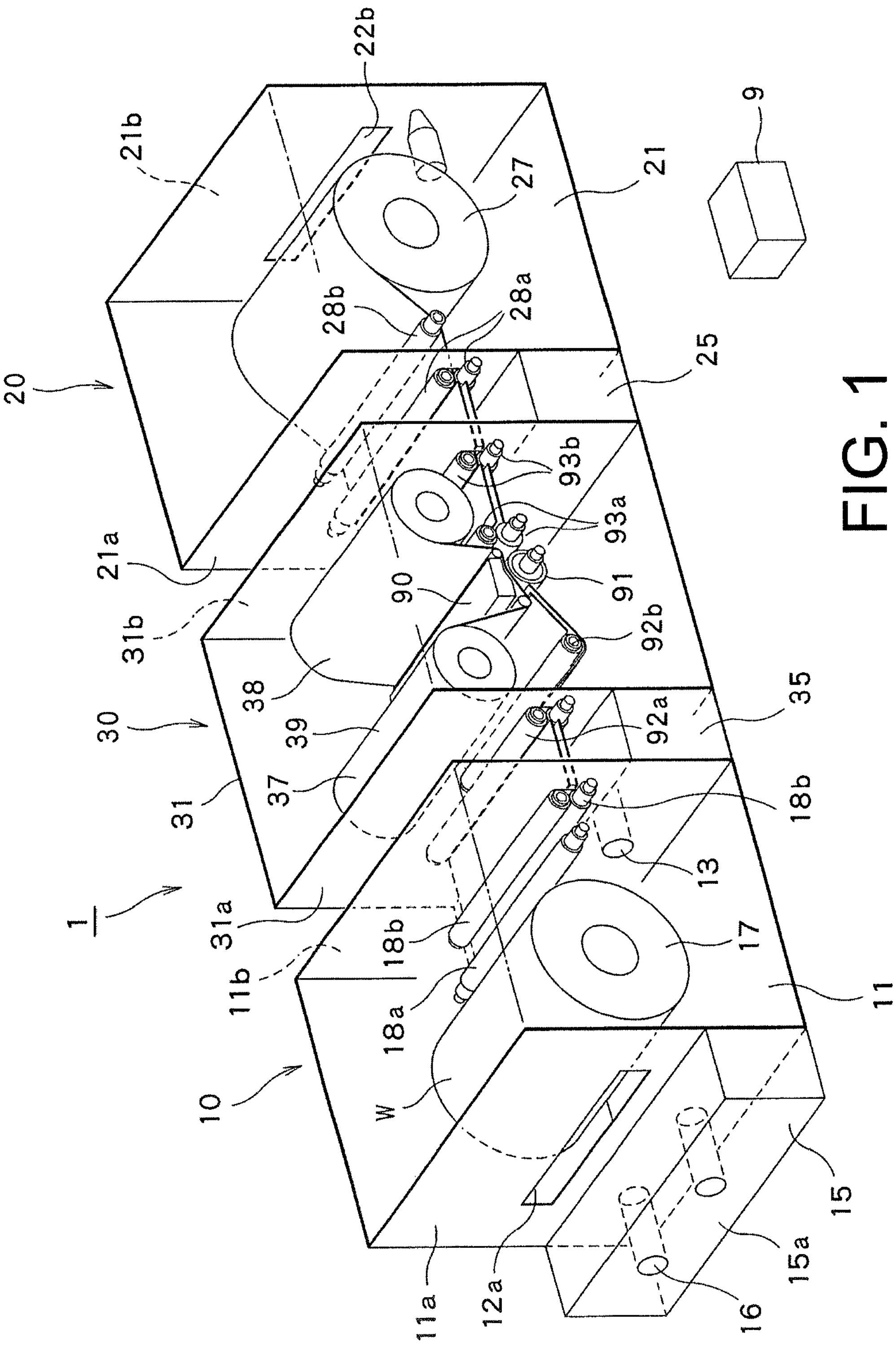
FIG. 1 is a schematic perspective view illustrating a printer system according to a first embodiment.

A first embodiment of the present disclosure is described below with reference to the drawings.

FIGS. 1 to 5 illustrate the first embodiment of the present disclosure.

First, a printer system 1 according to the first embodiment is described with reference to FIGS. 1 to 5.

As illustrated in FIGS. 1 to 5, the printer system 1 includes three modules 10, 30, and 20 that are successively disposed and coupled to each other. Among these modules, the module 10 on an upstream side is a print sheet feeding module 10 that has a print sheet feeding function of feeding a roll-shaped print sheet W, and the module 20 on a downstream side is a print sheet winding module 20 that has a function of winding the print sheet W on which printing has been performed.

Furthermore, the printer module 30 that performs printing on the print sheet W is disposed between the print sheet feeding module 10 and the print sheet winding module 20.

Among these modules, the print sheet feeding module 10 has a housing 11 and a print sheet feeding unit 17 provided in the housing 11. The print sheet W fed from the print sheet feeding unit 17 is sent to the printer module 30 through an opening 12*b* of an other surface 11*b*, which will be described later, while being guided by a guide roller 18*a* and a nip roller 18*b*.

Furthermore, the print sheet winding module 20 has a housing 21 and a print sheet winding unit 27 provided in the housing 21. The print sheet W on which printing has been performed by the printer module 30 enters the print sheet winding module 20 through an opening 22*a* of one surface 21*a*, which will be described later, and the print sheet W is wound by the print sheet winding unit 27 while being guided by the nip roller 28*a* and the guide roller 28*b*.

Furthermore, the printer module 30 has a housing 31, an ink ribbon feeding unit 37 that is provided in the housing 31 and feeds an ink ribbon 39, and an ink ribbon winding unit 38 that is provided in the housing 31 and winds the ink ribbon 39. Furthermore, a thermal head 90 and a platen roller 91 that perform printing on the print sheet W by sandwiching the print sheet W and the ink ribbon 39 is provided in the housing 31.

Furthermore, a nip roller 92*a* and a guide roller 92*b* that guide, toward the thermal head 90, the print sheet W fed from the print sheet feeding module 10 are provided in the housing 31. Furthermore, the print sheet W on which printing has been performed by the thermal head 90 is discharged toward the print sheet winding module 20 through an opening 32*b* provided in an other surface 31*b* of the housing 31 after passing a nip roller 93*a* and a nip roller 93*b*.

Figure 2:
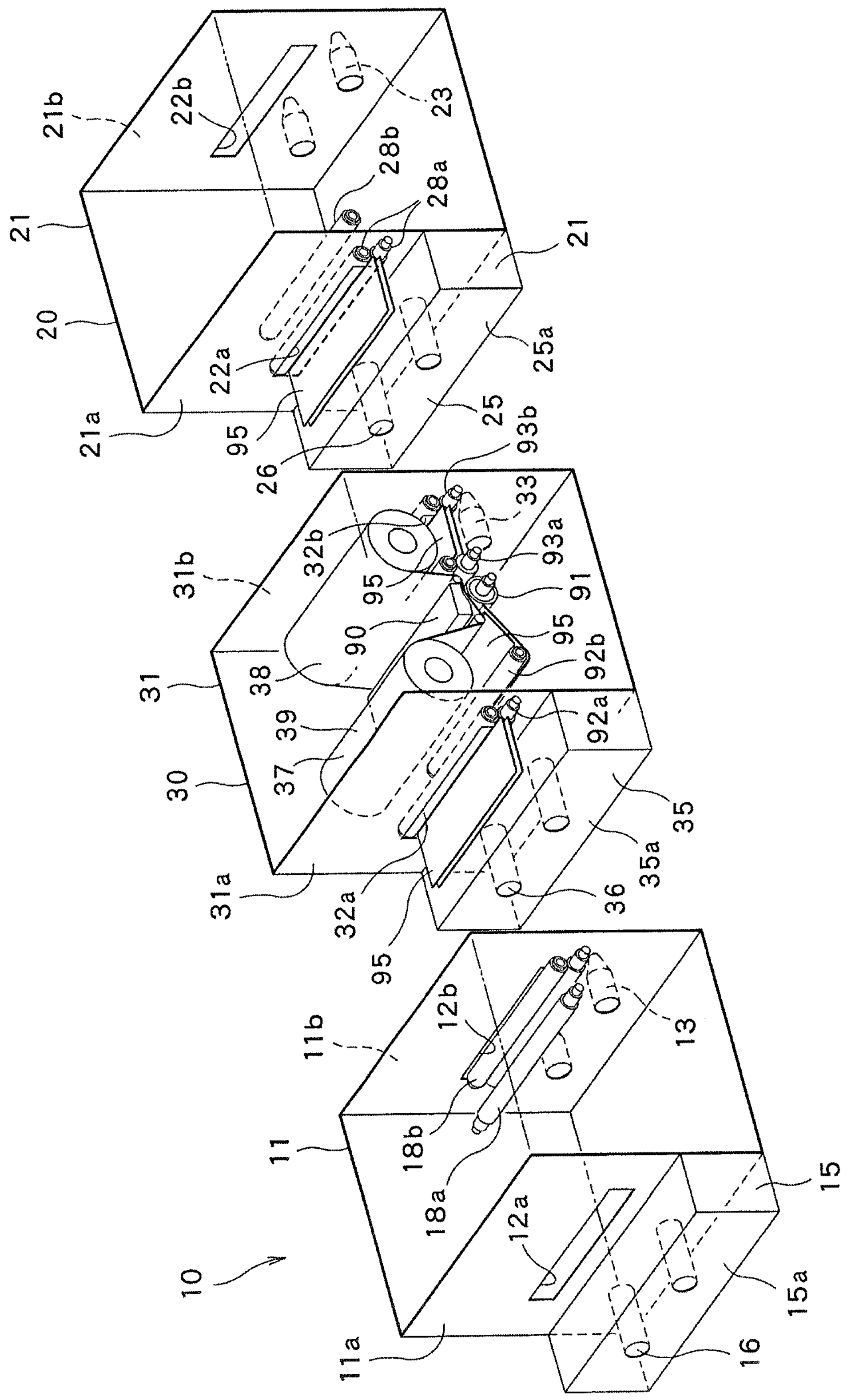
FIG. 2 is an exploded perspective view illustrating the printer system according to the first embodiment.
Figure 3:
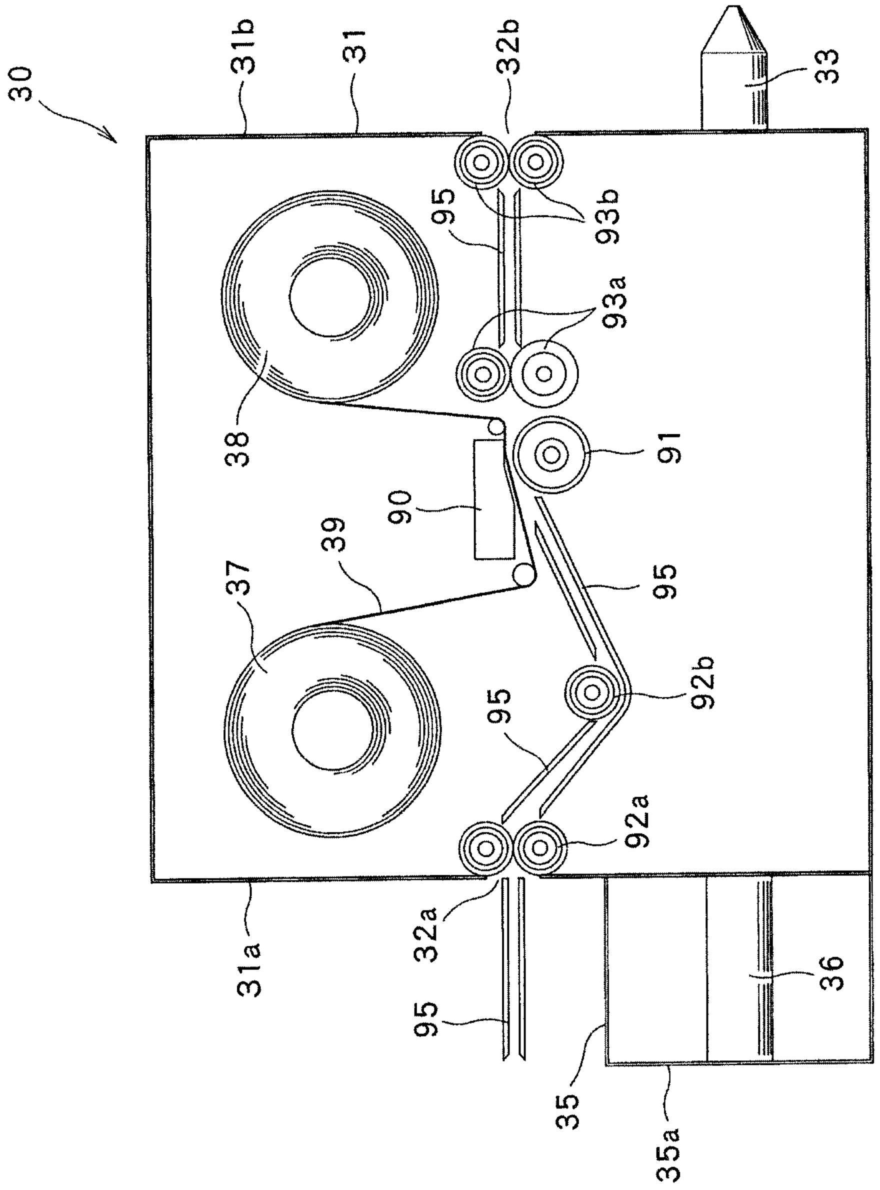
FIG. 3 is a side view illustrating a printer module of the printer system according to the first embodiment.

Furthermore, the housing 31 of the printer module 30 has, on one surface 31*a* of the housing 31, a guide path 95 that guides the print sheet W fed from the print sheet feeding module 10 (see FIGS. 2 and 3).

Furthermore, the guide path 95 that guides the print sheet W is also provided between the nip roller 92*a* and the guide roller 92*b*, between the guide roller 92*b* and the platen roller 91, and between the nip roller 93*a* and the nip roller 93*b* in the housing 31.

These guide paths 95 are supported in the housing 31 by a support mechanism (not illustrated).

The ink ribbon 39 fed from the ink ribbon feeding unit 37 provided in the printer module 30 includes three colors of yellow, magenta, and cyan and an overcoat layer. The three colors of yellow, magenta, and cyan and the OP layer can be printed on the print sheet W only by the ink ribbon 39.

Next, structures of the print sheet feeding module 10, the printer module 30, and the print sheet winding module 20 are further described.

The print sheet feeding module 10 has the housing 11 having a rectangular parallelepiped shape as described above and has, on one surface 11*a* of the housing 11, a coupling body 15 having a rectangular parallelepiped shape that protrudes from the one surface 11*a*. One of an outer surface 15*a* of the coupling body 15 and the other surface 11*b* that is opposed to the one surface 11*a*, for example, the outer surface 15*a* of the coupling body 15 has two insertion holes 16 that are arranged in a horizontal direction. The other one of the outer surface 15*a* of the coupling body 15 and the other surface 11*b*, for example, the other surface 11*b* has two insertion pins 13 that are arranged in the horizontal direction and are to be inserted into insertion holes 36 provided in a coupling body 35 (described later) of the adjacent printer module 30.

The print sheet winding module 20 has the housing 21 having a rectangular parallelepiped shape as described above and has, on the one surface 21*a* of the housing 21, a coupling body 25 having a rectangular parallelepiped shape that protrudes from the one surface 21*a*. One of an outer surface 25*a* of the coupling body 25 and an other surface 21*b* that is opposed to the one surface 21*a*, for example, the outer surface 25*a* of the coupling body 25 has two insertion holes 26 that are arranged in the horizontal direction. The other one of the outer surface 25*a* of the coupling body 25 and the other surface 21*b*, for example, the other surface 21*b* has two insertion pins 23 that are arranged in the horizontal direction.

The printer module 30 has the housing 31 having a rectangular parallelepiped shape as described above and has, on the one surface 31*a* of the housing 31, a coupling body 35 having a rectangular parallelepiped shape that protrudes from the one surface 31*a*. One of an outer surface 35*a* of the coupling body 35 and an other surface 31*b* that is opposed to the one surface 31*a*, for example, the outer surface 35*a* of the coupling body 35 has two insertion holes 36 that are arranged in the horizontal direction. The other one of the outer surface 35*a* of the coupling body 35 and the other surface 35*b*, for example, the other surface 31*b* has two insertion pins 33 that are arranged in the horizontal direction and are to be inserted into the insertion holes 26 provided in the coupling body 25 of the adjacent print sheet winding module 20.

In the present embodiment, the housing 11 of the print sheet feeding module 10 has a rectangular parallelepiped shape and has a larger size than the coupling body 15 that also has a rectangular parallelepiped shape. The coupling body 15 has a substantially identical width to the housing 11 and has a height that is approximately ¼ to ½ of a height of the housing 11. The width of the coupling body 15 and the width of the housing 11 are widths along a direction orthogonal to a travelling direction of the print sheet W.

The housing 21 of the print sheet winding module 20 has a rectangular parallelepiped shape and has a larger size than the coupling body 25 that also has a rectangular parallelepiped shape. The coupling body 25 has a substantially identical width to the housing 21 and has a height that is approximately ¼ to ½ of a height of the housing 21. The width of the coupling body 25 and the width of the housing 21 are widths along the direction orthogonal to the travelling direction of the print sheet W.

The housing 31 of the printer module 30 has a rectangular parallelepiped shape and has a larger size than the coupling body 35 that also has a rectangular parallelepiped shape. The coupling body 35 has a substantially identical width to the housing 31 and has a height that is approximately ¼ to ½ of a height of the housing 31. The width of the coupling body 35 and the width of the housing 31 are widths along the direction orthogonal to the travelling direction of the print sheet W.

Furthermore, the one surface 11a and the other surface 11b of the housing 11 of the print sheet feeding module 10 have, at positions higher than the coupling body 15, openings 12a and 12b through which the print sheet W passes, respectively. A first contact point 81a is provided on the other surface 11b of the housing 11, and a second contact point 81b is provided on the outer surface 15a of the coupling body 15.

The one surface 21a and the other surface 21b of the housing 21 of the print sheet winding module 20 have, at positions higher than the coupling body 25, openings 22a and 22b through which the print sheet W passes, respectively. A first contact point 81a is provided on the other surface 21b of the housing 21, and a second contact point 81b that is electrically connected to the first contact point 81a of the adjacent printer module 30 is provided on the outer surface 25a of the coupling body 25.

Furthermore, the one surface 31a and the other surface 31b of the printer module 30 have, at positions higher than the coupling body 35, openings 32a and 32b through which the print sheet W passes, respectively. A first contact point 81a is provided on the other surface 31b of the housing 31. A second contact point 81b that is electrically connected to the first contact point 81a of the adjacent print sheet feeding module 10 is provided on the outer surface 35a of the coupling body 35.

It is preferable that the housing 11 and the coupling body 15 of the print sheet feeding module 10, the housing 21 and the coupling body 25 of the print sheet winding module 20, and the housing 31 and the coupling body 35 of the printer module 30 have identical external shapes and identical structures. In a case where the housing 11 and the coupling body 15 of the print sheet feeding module 10, the housing 21 and the coupling body 25 of the print sheet winding module 20, and the housing 31 and the coupling body 35 of the printer module 30 have identical external shapes and identical structures, the modules 10, 20, and 30 can be easily produced by using housings and coupling bodies that have identical external shapes and identical structures and disposing internal structures corresponding to the respective modules in the housings.

Next, working of the present embodiment having such a configuration is described.

Figure 4:
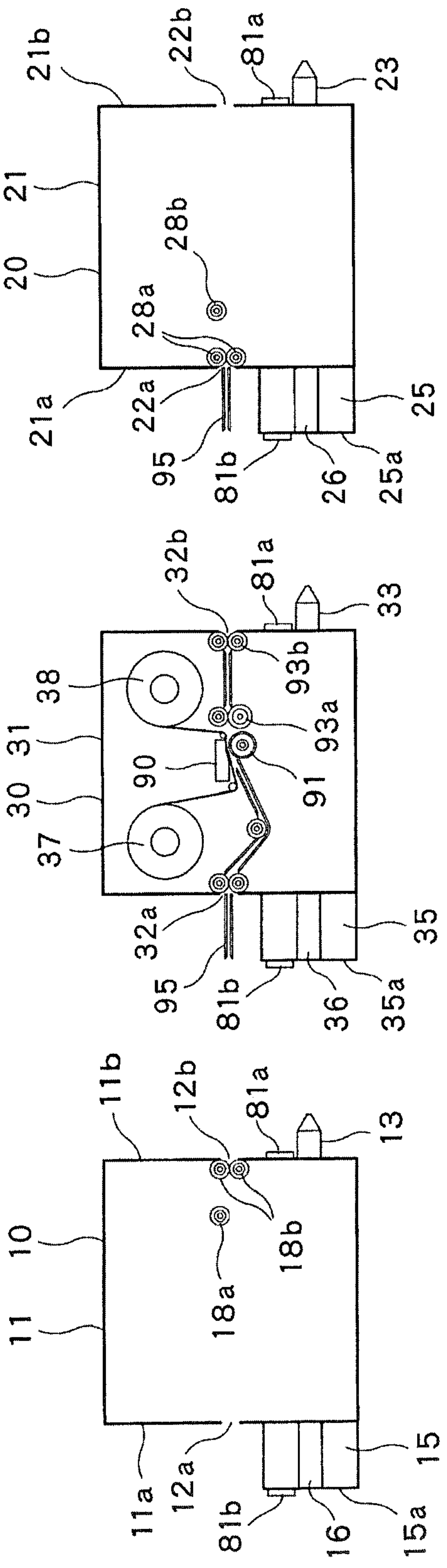
FIG. 4 is a side view illustrating the printer system before assembling according to the first embodiment.

First, as illustrated in FIG. 4, the print sheet feeding module 10, the print sheet winding module 20, and the printer module 30 are prepared.

In FIG. 4, the print sheet feeding unit 17 has not been disposed yet in the housing 11 of the print sheet feeding module 10, and the print sheet winding unit 27 has not been disposed yet in the housing 21 of the print sheet winding module 20.

Figure 5:
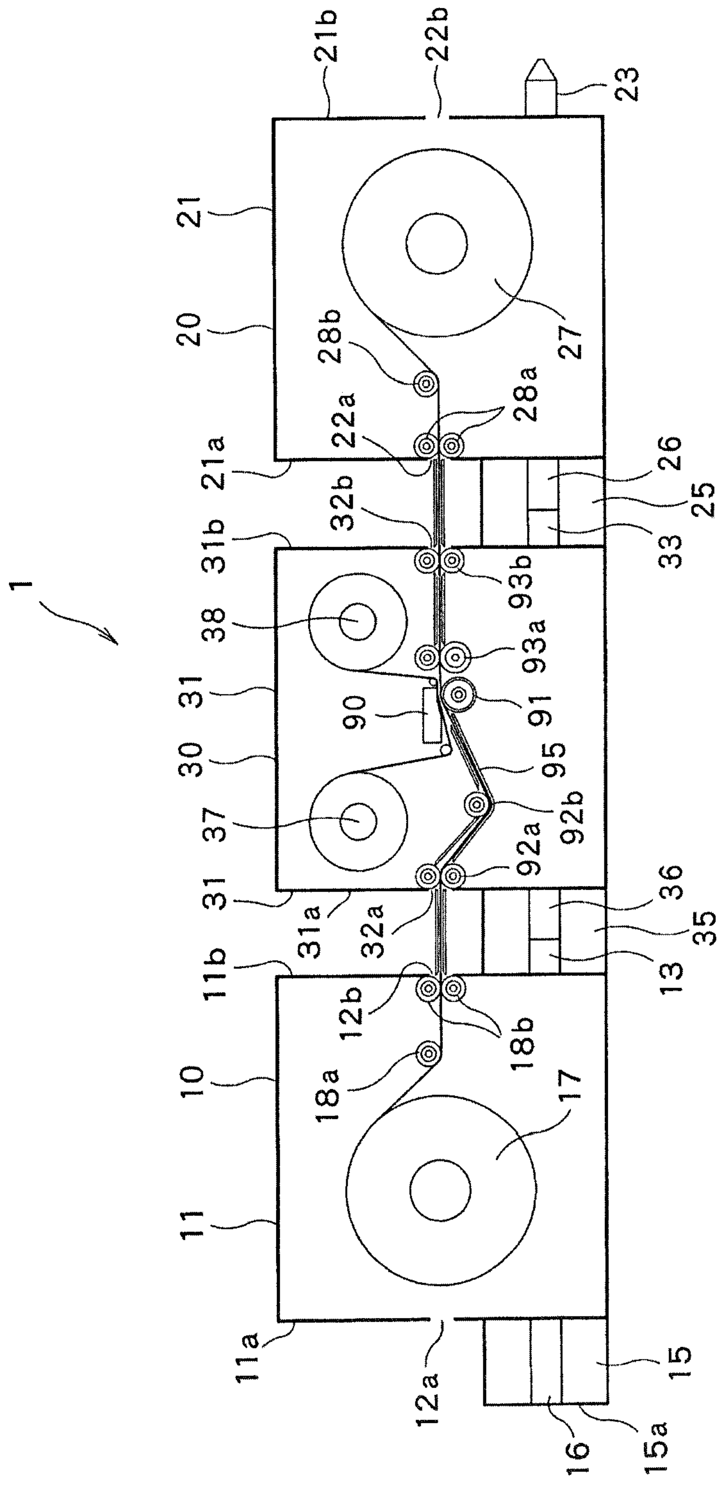
FIG. 5 is a side view illustrating the printer system after assembling according to the first embodiment.

Next, as illustrated in FIG. 5, the other surface 11b of the housing 11 of the print sheet feeding module 10 and the outer surface 35a of the coupling body 35 of the printer module 30 are joined. At this time, the insertion pins 13 of the housing 11 of the print sheet feeding module 10 are inserted into the insertion holes 36 of the coupling body 35 of the printer module 30.

The first contact point 81a of the housing 11 of the print sheet feeding module 10 is electrically connected to the second contact point 81b of the coupling body 35 of the printer module 30. Information indicating that the first contact point 81a and the second contact point 81b have been connected to each other is sent to an external control circuit 9.

In this way, the housing 11 of the print sheet feeding module 10 and the coupling body 35 of the printer module 30 can be joined with high positional accuracy.

Similarly, the other surface 31b of the housing 31 of the printer module 30 and the outer surface 25a of the coupling body 25 of the print sheet winding module 20 are joined. At this time, the insertion pins 33 of the housing 31 of the printer module 30 are inserted into the insertion holes 26 of the coupling body 25 of the print sheet winding module 20.

The first contact point 81a of the housing 31 of the printer module 30 is electrically connected to the second contact point 81b of the coupling body 25 of the print sheet winding module 20, and information indicating that the first contact point 81a and the second contact point 81b have been connected to each other is sent to the external control circuit 9.

In this way, the housing 31 of the printer module 30 and the coupling body 25 of the print sheet winding module 20 can be joined with high positional accuracy.

Then, the print sheet feeding unit 17 is placed in the housing 11 of the print sheet feeding module 10, and the print sheet winding unit 27 is placed in the housing 21 of the print sheet winding module 20. In this way, the printer system 1 is obtained (see FIG. 5).

Next, as illustrated in FIG. 1, the print sheet W is fed from the print sheet feeding unit 17 disposed in the housing 11 of the print sheet feeding module 10. The print sheet W passes the guide roller 18a and the nip roller 18b in the housing 11, is discharged through the opening 12b of the housing 11, is led to the guide path 95 of the printer module 30, and enters the housing 31 of the printer module 30 through the opening 32a.

The print sheet W sent into the housing 31 of the printer module 30 sequentially passes the nip roller 92a, the guide roller 92b, and the guide path 95 and is then sent to a position between the thermal head 90 and the platen roller 91.

Similarly, the ink ribbon 39 is sent from the ink ribbon feeding unit 37 to a position between the thermal head 90 and the platen roller 91. In this case, the ink ribbon 39 has the colors of yellow, magenta, and cyan and the overcoat layer.

The print sheet W and the ink ribbon 39 are sandwiched between the thermal head 90 and the platen roller 91, and the ink ribbon 39 is thermally pressed against the print sheet W by the thermal head 90. In this way, the colors of yellow, magenta, and cyan of the ink ribbon 39 are thermally transferred onto the print sheet W by the thermal head 90 by a sublimation process. Furthermore, the overcoat layer is thermally transferred onto the print sheet W onto which the colors have been thermally transferred, and thereby printing is performed.

In this way, the colors of yellow, magenta, and cyan and the overcoat layer are thermally transferred onto an upper surface of the print sheet W by thermally pressing the ink ribbon 39 by the thermal head 90, and thereby printing is performed.

The print sheet W on which printing is thus performed by the thermal head 90 passes the nip roller 93a, the nip roller 93b, and the guide path 95 and is then sent to an outside of the housing 31 of the printer module 30 through the opening 32b.

Then, the print sheet W sent to the outside from the housing 31 of the printer module 30 enters the housing 21 through the opening 22*a* from the guide path 95 provided on the housing 21 of the print sheet winding module 20.

Next, in the housing 21 of the print sheet winding module 20, the print sheet W sequentially passes the nip roller 28*a* and the guide roller 28*b* and is then wound by the print sheet winding unit 27.

As described above, according to the present embodiment, the other surface 11*b* of the housing 11 of the print sheet feeding module 10 and the outer surface 35*a* of the coupling body 35 of the printer module 30 are joined, and the insertion pins 13 of the housing 11 are inserted into the insertion holes 36 of the coupling body 35. This makes it possible to easily and accurately assemble the print sheet feeding module 10 and the printer module 30.

The other surface 31*b* of the housing 31 of the printer module 30 and the outer surface 25*a* of the coupling body 25 of the print sheet winding module 20 are joined, and the insertion pins 33 of the housing 31 are inserted into the insertion holes 26 of the coupling body 25. This makes it possible to easily and accurately assemble the printer module 30 and the print sheet winding module 20.

Furthermore, the coupling bodies 35 and 25, which have a smaller size than the housings 11, 31, and 21, are interposed between the housings 11, 31, and 21 of the modules 10, 30, and 20, and heights of the coupling bodies 15, 35, and 25 are kept lower than heights of the housings 11, 31, and 21. Furthermore, the openings 12*a*, 12*b*, 32*a*, 32*b*, 22*a*, and 22*b* of the housings 11, 31, and 21 are located at positions higher than the coupling bodies 15, 35, and 25. With this configuration, regions above the coupling bodies 35 and 25 between the housings 11, 31, and 21 can be used as travelling regions where the print sheet W travels. Furthermore, a width of the whole printer system 10 in a direction orthogonal to the travelling direction of the print sheet W can be made uniform by making the widths of the housings 11, 31, and 21 identical to the widths of the coupling bodies 15, 35, and 25.

Second Embodiment

Next, a second embodiment of the present disclosure is described with reference to the drawings.

FIGS. 6 to 9 illustrate the second embodiment of the present disclosure.

In the second embodiment illustrated in FIGS. 6 to 9, a YMC printer module 30A, a spot color printer module 40, and an OP layer printer module 50 are disposed between a print sheet feeding module 10 and a print sheet winding module 20. The configuration except for this is substantially identical to the configuration of the first embodiment illustrated in FIGS. 1 to 5.

In the second embodiment illustrated in FIGS. 6 to 9, parts identical to those in the first embodiment illustrated in FIGS. 1 to 5 are given identical reference signs, and detailed description thereof is omitted.

First, a printer system 1 according to the second embodiment is described with reference to FIGS. 6 to 9.

As illustrated in FIGS. 6 to 9, the printer system 1 includes five modules 10, 30A, 40, 50, and 20 that are successively disposed and are coupled to each other. Among these modules, the module 10 on an upstream side is a print sheet feeding module 10 that has a print sheet feeding function of feeding a roll-shaped print sheet W, and the module 20 on a downstream side is a print sheet winding module 20 that has a function of winding the print sheet W on which printing has been performed.

Furthermore, the YMC printer module 30A, the spot color printer module 40, and the OP layer printer module 50 that perform printing on the print sheet W are provided between the print sheet feeding module 10 and the print sheet winding module 20.

Among these modules, the print sheet feeding module 10 has a housing 11 and a print sheet feeding unit 17 provided in the housing 11. The print sheet W fed from the print sheet feeding unit 17 is sent to the YMC printer module 30A through an opening 12*b* of an other surface 11*b*, which will be described later, while being guided by a guide roller 18*a* and a nip roller 18*b*.

The print sheet winding module 20 has a housing 21 and a print sheet winding unit 27 provided in the housing 21. The print sheet W on which printing has been performed by the YMC printer module 30A, the spot color printer module 40, and the OP layer printer module 50 enters the print sheet winding module 20 through an opening 22*a* of one surface 21*a*, which will be described later. The print sheet W is wound by the print sheet winding unit 27 while being guided by a nip roller 28*a* and a guide roller 28*b*.

Furthermore, the YMC printer module 30A has a housing 31, an ink ribbon feeding unit 37A that is provided in the housing 31 and feeds an ink ribbon 39A, and an ink ribbon winding unit 38A that is provided in the housing 31 and winds the ink ribbon 39A. Furthermore, a thermal head 90 and a platen roller 91 that sandwich the print sheet W and the ink ribbon 39A and perform printing on the print sheet W are provided in the housing 31.

Furthermore, a nip roller 92*a* and a guide roller 92*b* that guide, toward the thermal head 90, the print sheet W fed from the print sheet feeding module 10 are provided in the housing 31. Furthermore, the print sheet W on which printing has been performed by the thermal head 90 is discharged toward the spot color printer module 40 through an opening 32*b* of an other surface 31*b* of the housing 31 after passing a nip roller 93*a* and a nip roller 93*b*.

Figure 6:
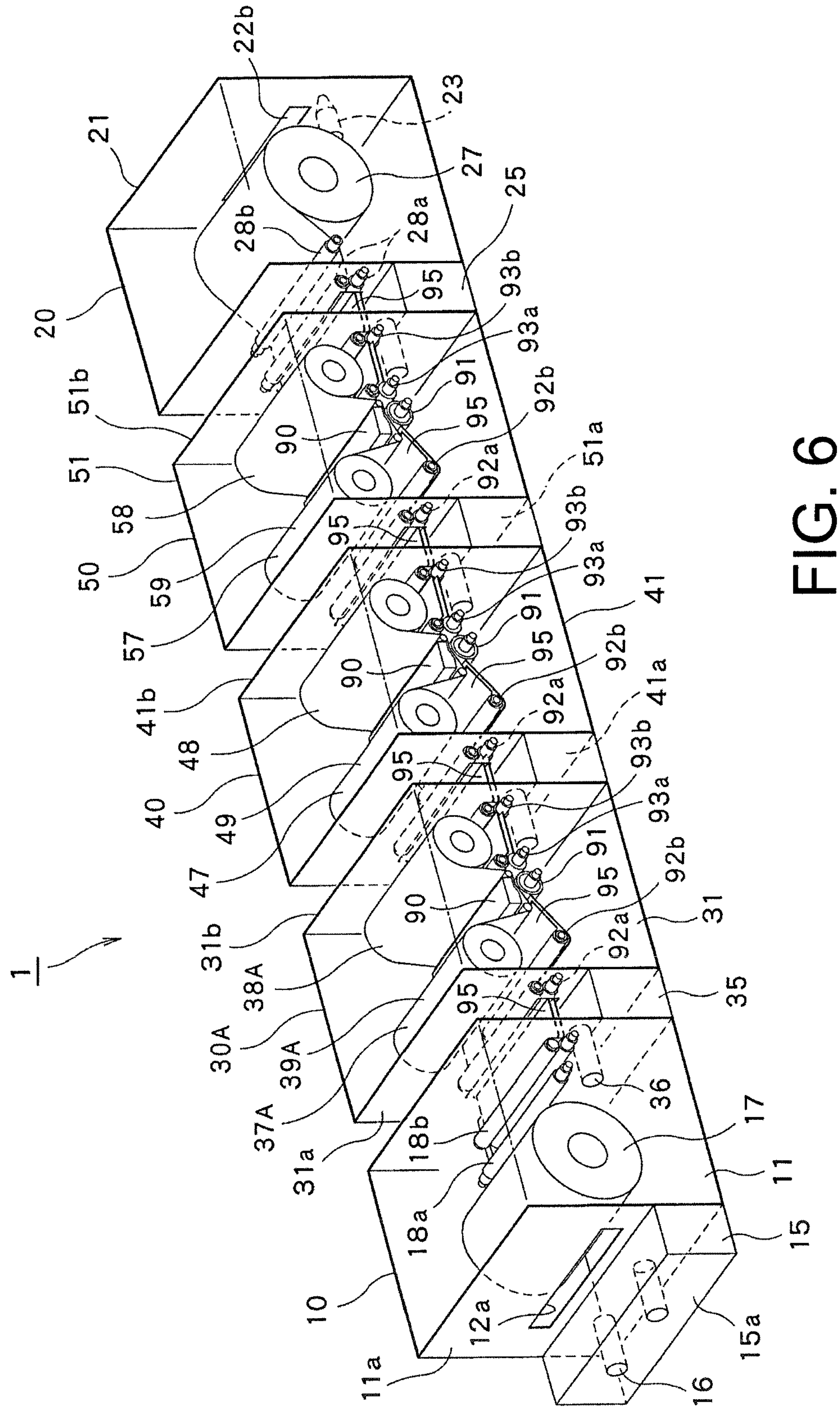
FIG. 6 is a schematic perspective view illustrating a printer system according to a second embodiment.

Furthermore, the housing 31 of the YMC printer module 30A has, on one surface 31*a* of the housing 31, a guide path 95 that guides the print sheet W fed from the print sheet feeding module 10 (see FIG. 6).

Furthermore, the guide path 95 that guides the print sheet W is provided between the nip roller 92*a* and the guide roller 92*b*, between the guide roller 92*b* and the platen roller 91, and between the nip roller 93*a* and the nip roller 93*b* in the housing 31.

These guide paths 95 are supported in the housing 31 by a support mechanism (not illustrated).

The ink ribbon 39A fed from the ink ribbon feeding unit 37A provided in the YMC printer module 30A includes three colors of yellow (Y), magenta (M), and cyan (C).

Furthermore, the spot color printer module 40 has a housing 41, an ink ribbon feeding unit 47 that is provided in the housing 41 and feeds an ink ribbon 49, and an ink ribbon winding unit 48 that is provided in the housing 41 and winds the ink ribbon 49. Furthermore, a thermal head 90 and a platen roller 91 that sandwich the print sheet W and the ink ribbon 49 and perform printing on the print sheet W are provided in the housing 41.

Furthermore, a nip roller 92*a* and a guide roller 92*b* that guide, toward the thermal head 90, the print sheet W sent from the YMC printer module 30A are provided in the housing 41. Furthermore, the print sheet W on which printing has been performed by the thermal head 90 is discharged toward the OP layer printer module 50 through an opening 42*b* of an other surface 41*b* of the housing 41 after passing a nip roller 93*a* and a nip roller 93*b*.

Furthermore, the housing 41 of the spot color printer module 40 has, on one surface 41*a* of the housing 41, a guide path 95 that guides the print sheet W sent from the YMC printer module 30A (see FIG. 6).

Furthermore, the guide path 95 that guides the print sheet W is also provided between the nip roller 92*a* and the guide roller 92*b*, between the guide roller 92*b* and the platen roller 91, and between the nip roller 93*a* and the nip roller 93*b* in the housing 41.

These guide paths 95 are supported in the housing 41 by a support mechanism (not illustrated).

The ink ribbon 49 fed from the ink ribbon feeding unit 47 provided in the spot color printer module 40 includes a spot color other than yellow, magenta, and cyan.

Furthermore, the OP layer printer module 50 has a housing 51, an ink ribbon feeding unit 57 that is provided in the housing 51 and feeds an ink ribbon 59, and an ink ribbon winding unit 58 that is provided in the housing 51 and winds the ink ribbon 59. Furthermore, a thermal head 90 and a platen roller 91 that sandwich the print sheet W and the ink ribbon 59 and perform printing on the print sheet W are provided in the housing 51.

Furthermore, a nip roller 92*a* and a guide roller 92*b* that guide, toward the thermal head 90, the print sheet W sent from the spot color printer module 40 are provided in the housing 51. Furthermore, the print sheet W on which printing has been performed by the thermal head 90 is discharged toward the print sheet winding module 20 through an opening 52*b* of an other surface 51*b* of the housing 51 after passing a nip roller 93*a* and a nip roller 93*b*.

Furthermore, the housing 51 of the OP layer printer module 50 has, on one surface 51*a* of the housing 51, a guide path 95 that guides the print sheet W sent from the spot color printer module 40 (see FIG. 6).

Furthermore, the guide path 95 that guides the print sheet W is also provided between the nip roller 92*a* and the guide roller 92*b*, between the guide roller 92*b* and the platen roller 91, and between the nip roller 93*a* and the nip roller 93*b* in the housing 51.

These guide paths 95 are supported in the housing 51 by a support mechanism (not illustrated).

The ink ribbon 59 fed from the ink ribbon feeding unit 57 provided in the OP layer printer module 50 includes an overcoat layer (OP layer).

Next, structures of the print sheet feeding module 10, the YMC printer module 30A, the spot color printer module 40, the OP layer printer module 50, and the print sheet winding module 20 are further described.

The print sheet feeding module 10 has the housing 11 having a rectangular parallelepiped shape as described above and has, on one surface 11*a* of the housing 11, a coupling body 15 having a rectangular parallelepiped shape that protrudes from the one surface 11*a*. One of an outer surface 15*a* of the coupling body 15 and the other surface 11*b* that is opposed to the one surface 11*a*, for example, the outer surface 15*a* of the coupling body 15 has two insertion holes 16 that are arranged in a horizontal direction. The other one of the outer surface 15*a* of the coupling body 15 and the other surface 11*b*, for example, the other surface 11*b* has two insertion pins 13 that are arranged in the horizontal direction and are to be inserted into insertion holes 36 of a coupling body 35 (described later) of the adjacent YMC printer module 30A.

The print sheet winding module 20 has the housing 21 having a rectangular parallelepiped shape as described above and has, on one surface 21*a* of the housing 21, a coupling body 25 having a rectangular parallelepiped shape that protrudes from the one surface 21*a*. One of an outer surface 25*a* of the coupling body 25 and the other surface 21*b* that is opposed to the one surface 21*a*, for example, the outer surface 25*a* of the coupling body 25 has two insertion holes 26 that are arranged in the horizontal direction. The other one of the outer surface 25*a* of the coupling body 25 and the other surface 21*b*, for example, the other surface 21*b* has two insertion pins 23 that are arranged in the horizontal direction.

The YMC printer module 30A has the housing 31 having a rectangular parallelepiped shape as described above and has, on one surface 31*a* of the housing 31, a coupling body 35 having a rectangular parallelepiped shape that protrudes from the one surface 31*a*. One of an outer surface 35*a* of the coupling body 35 and the other surface 31*b* that is opposed to the one surface 31*a*, for example, the outer surface 35*a* of the coupling body 35 has two insertion holes 36 that are arranged in the horizontal direction. The other one of the outer surface 35*a* of the coupling body 35 and the other surface 35*b*, for example, the other surface 31*b* has two insertion pins 33 that are arranged in the horizontal direction and are to be inserted into insertion holes 46 of a coupling body 45 of the adjacent spot color printer module 40.

The spot color printer module 40 has the housing 41 having a rectangular parallelepiped shape as described above and has, on one surface 41*a* of the housing 41, a coupling body 45 having a rectangular parallelepiped shape that protrudes from the one surface 41*a*. One of an outer surface 45*a* of the coupling body 45 and the other surface 41*b* that is opposed to the one surface 41*a*, for example, the outer surface 45*a* of the coupling body 45 has two insertion holes 46 that are arranged in the horizontal direction. The other one of the outer surface 45*a* of the coupling body 45 and the other surface 41*b*, for example, the other surface 41*b* has two insertion pins 43 that are arranged in the horizontal direction and are to be inserted into insertion holes 56 of a coupling body 55 of the adjacent OP layer printer module 50.

The OP layer printer module 50 has the housing 51 having a rectangular parallelepiped shape as described above and has, on one surface 51*a* of the housing 51, a coupling body 55 having a rectangular parallelepiped shape that protrudes from the one surface 51*a*. One of an outer surface 55*a* of the coupling body 55 and the other surface 51*b* that is opposed to the one surface 51*a*, for example, the outer surface 55*a* of the coupling body 55 has two insertion holes 56 that are arranged in the horizontal direction. The other one of the outer surface 55*a* of the coupling body 55 and the other surface 51*b*, for example, the other surface 51*b* has two insertion pins 53 that are arranged in the horizontal direction and are to be inserted into the insertion holes 26 of the coupling body 25 of the adjacent print sheet winding module 20.

In the present embodiment, the housing 11 of the print sheet feeding module 10 has a rectangular parallelepiped shape and has a larger size than the coupling body 15 that also has a rectangular parallelepiped shape. The coupling body 15 has a substantially identical width to the housing 11 and has a height that is approximately ¼ to ½ of a height of the housing 11. The width of the coupling body 15 and the width of the housing 11 are widths along a direction orthogonal to a travelling direction of the print sheet W.

The housing 21 of the print sheet winding module 20 has a rectangular parallelepiped shape and has a larger size than the coupling body 25 that also has a rectangular parallelepiped shape. The coupling body 25 has a substantially identical width to the housing 21 and has a height that is approximately ¼ to ½ of a height of the housing 21. The width of the coupling body 25 and the width of the housing 21 are widths along the direction orthogonal to the travelling direction of the print sheet W.

The housing 31 of the YMC printer module 30A has a rectangular parallelepiped shape and has a larger size than the coupling body 35 that also has a rectangular parallelepiped shape. The coupling body 35 has a substantially identical width to the housing 31 and has a height that is approximately ¼ to ½ of a height of the housing 31. The width of the coupling body 35 and the width of the housing 31 are widths along the direction orthogonal to the travelling direction of the print sheet W.

The housing 41 of the spot color printer module 40 has a rectangular parallelepiped shape and has a larger size than the coupling body 45 that also has a rectangular parallelepiped shape. The coupling body 45 has a substantially identical width to the housing 41 and has a height that is approximately ¼ to ½ of a height of the housing 41. The width of the coupling body 45 and the width of the housing 41 are widths along the direction orthogonal to the travelling direction of the print sheet W.

The housing 51 of the OP layer printer module 50 has a rectangular parallelepiped shape and has a larger size than the coupling body 55 that also has a rectangular parallelepiped shape. The coupling body 55 has a substantially identical width to the housing 51 and has a height that is approximately ¼ to ½ of a height of the housing 51. The width of the coupling body 55 and the width of the housing 51 are widths along the direction orthogonal to the travelling direction of the print sheet W.

Furthermore, the one surface 11*a* and the other surface 11*b* of the housing 11 of the print sheet feeding module 10 have, at positions higher than the coupling body 15, openings 12*a* and 12*b* through which the print sheet W passes, respectively. A first contact point 81*a* is provided on the other surface 11*b* of the housing 11, and a second contact point 81*b* is provided on the outer surface 15*a* of the coupling body 15.

The one surface 21*a* and the other surface 21*b* of the housing 21 of the print sheet winding module 20 have, at positions higher than the coupling body 25, openings 22*a* and 22*b* through which the print sheet W passes, respectively. A first contact point 81*a* is provided on the other surface 21*b* of the housing 21, and a second contact point 81*b* that is electrically connected to a first contact point 81*a* of the adjacent OP layer printer module 50 is provided on the outer surface 25*a* of the coupling body 25.

Furthermore, the one surface 31*a* and the other surface 31*b* of the housing 31 of the YMC printer module 30A have, at positions higher than the coupling body 35, openings 32*a* and 32*b* through which the print sheet W passes, respectively. A first contact point 81*a* is provided on the other surface 31*b* of the housing 31. A second contact point 81*b* that is electrically connected to the first contact point 81*a* of the adjacent print sheet feeding module is provided on the outer surface 35*a* of the coupling body 35.

Furthermore, the one surface 41*a* and the other surface 41*b* of the housing 41 of the spot color printer module 40 have, at positions higher than the coupling body 45, openings 42*a* and 42*b* through which the print sheet W passes, respectively, and a first contact point 81*a* is provided on the other surface 41*b* of the housing 41. A second contact point 81*b* that is electrically connected to the first contact point 81*a* of the adjacent YMC printer module 30A is provided on the outer surface 45*a* of the coupling body 45.

Furthermore, the one surface 51*a* and the other surface 51*b* of the housing 51 of the OP layer printer module 50 have, at positions higher than the coupling body 55, openings 52*a* and 52*b* through which the print sheet W passes, respectively. A first contact point 81*a* is provided on the other surface 51*b* of the housing 51. A second contact point 81*b* that is electrically connected to the first contact point 81*a* of the adjacent spot color printer module 40 is provided on the outer surface 55*a* of the coupling body 55.

It is preferable that the housing 11 and the coupling body 15 of the print sheet feeding module 10, the housing 21 and the coupling body 25 of the print sheet winding module 20, the housing 31 and the coupling body 35 of the YMC printer module 30A, the housing 41 and the coupling body 45 of the spot color printer module 40, and the housing 51 and the coupling body 55 of the OP layer printer module 50 have identical external shapes and identical structures. In a case where the housing 11 and the coupling body 15 of the print sheet feeding module 10, the housing 21 and the coupling body 25 of the print sheet winding module 20, the housing 31 and the coupling body 35 of the YMC printer module 30A, the housing 41 and the coupling body 45 of the spot color printer module 40, and the housing 51 and the coupling body 55 of the OP layer printer module 50 have identical external shapes and identical structures, the modules 10, 20, 30A, 40, and 50 can be easily produced by using housings and coupling bodies that have identical external shapes and identical structures and disposing internal structures corresponding to the respective modules in the housings.

Next, working of the present embodiment having such a configuration is described.

Figure 7:
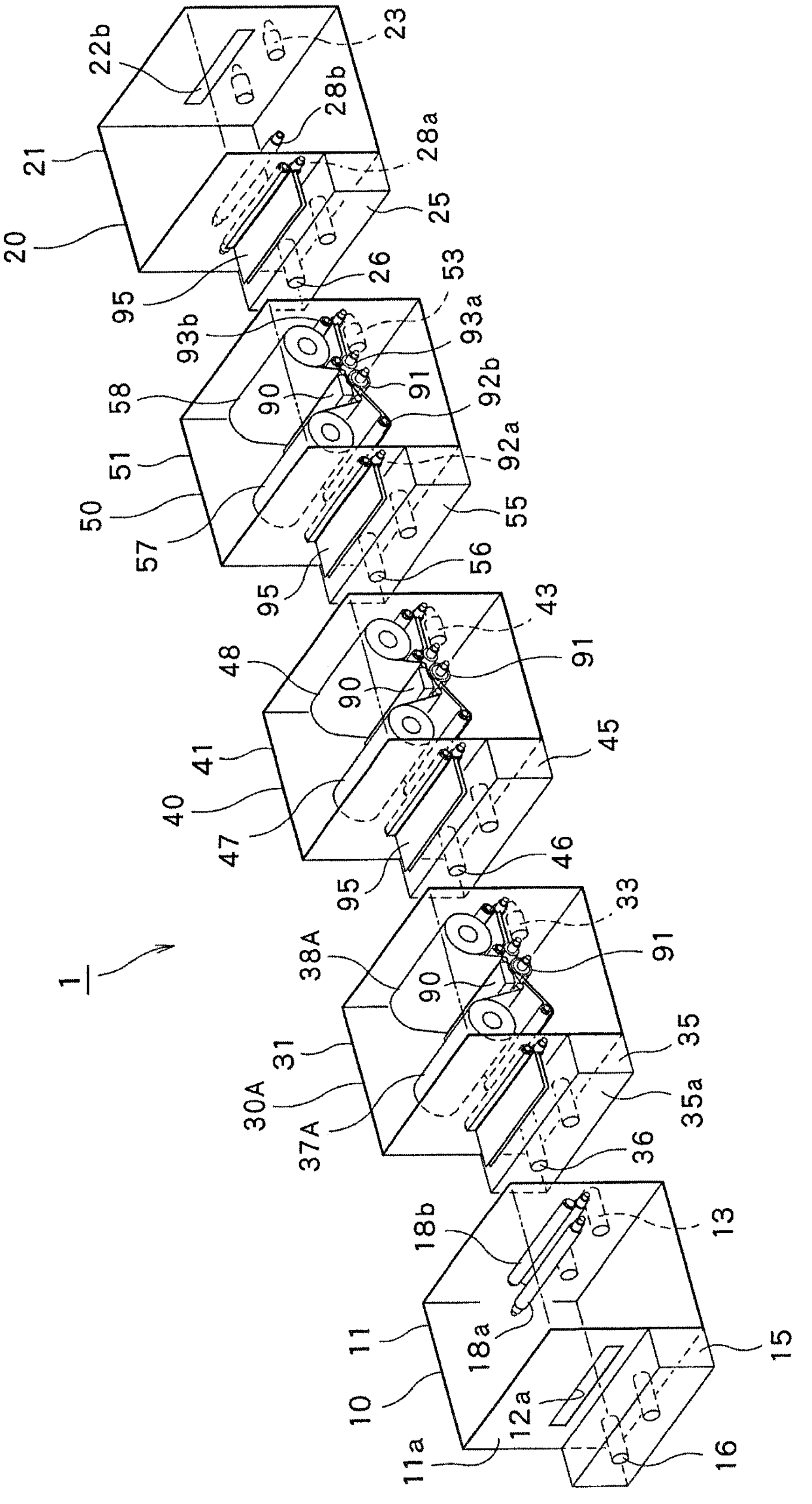
FIG. 7 is an exploded perspective view illustrating the printer system according to the second embodiment.
Figure 8:
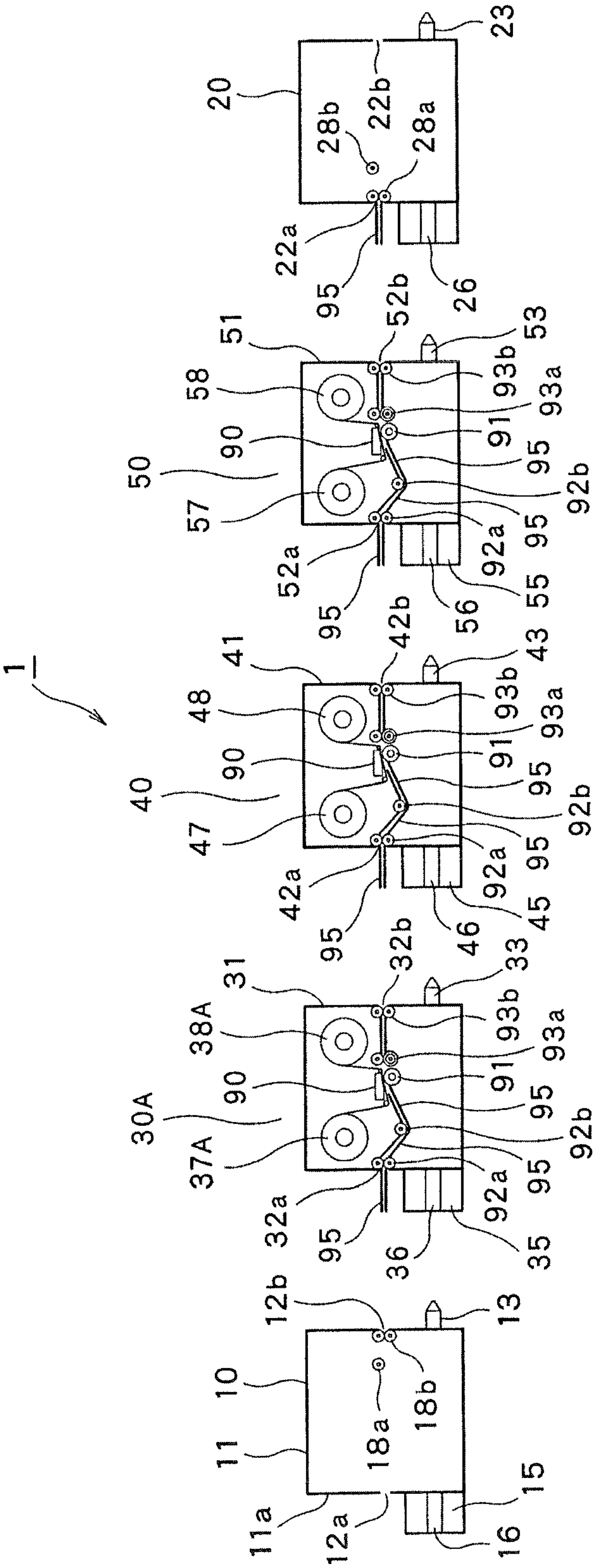
FIG. 8 is a side view illustrating the printer system before assembling according to the second embodiment.

First, as illustrated in FIGS. 7 and 8, the print sheet feeding module 10, the print sheet winding module 20, the YMC printer module 30A, the spot color printer module 40, the OP layer printer module 50, and the printer module 30 are prepared.

In FIGS. 7 and 8, the print sheet feeding unit 17 has not been disposed yet in the housing 11 of the print sheet feeding module 10, and the print sheet winding unit 27 has not been disposed yet in the housing 21 of the print sheet winding module 20.

Figure 9:
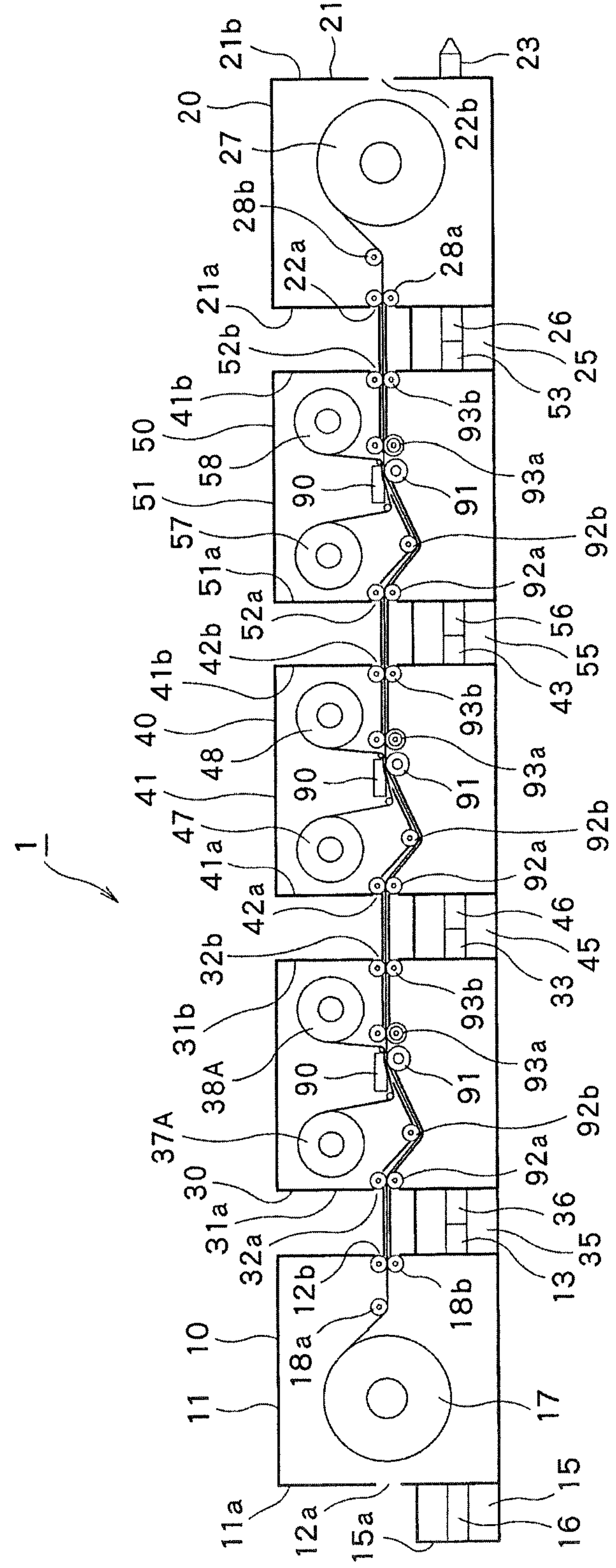
FIG. 9 is a side view illustrating the printer system after assembling according to the second embodiment.

Next, as illustrated in FIG. 9, the other surface 11*b* of the housing 11 of the print sheet feeding module 10 and the outer surface 35*a* of the coupling body 35 of the YMC printer module 30A are joined. At this time, the insertion pins 13 of the housing 11 of the print sheet feeding module 10 are inserted into the insertion holes 36 of the coupling body 35 of the YMC printer module 30A.

The first contact point 81*a* of the housing 11 of the print sheet feeding module 10 is electrically connected to the second contact point 81*b* of the coupling body 35 of the YMC printer module 30A. Information indicating that the first contact point 81*a* and the second contact point 81*b* are connected to each other is sent to an external control circuit 9.

In this way, the housing 11 of the print sheet feeding module 10 and the coupling body 35 of the YMC printer module 30A can be joined with high positional accuracy.

Similarly, the YMC printer module 30A and the spot color printer module 40 are joined, and the spot color printer module 40 and the OP layer printer module 50 are joined.

Finally, the other surface 51*b* of the housing 51 of the OP layer printer module 50 and the outer surface 25*a* of the coupling body 25 of the print sheet winding module 20 are joined. At this time, the insertion pins 53 of the housing 51 of the OP layer printer module 50 are inserted into the insertion holes 26 of the coupling body 25 of the print sheet winding module 20.

Furthermore, the first contact point 81*a* of the housing 51 of the OP layer printer module 50 is electrically connected to the second contact point 81*b* of the coupling body 25 of the print sheet winding module 20. Information indicating that the first contact point 81*a* and the second contact point 81*b* have been connected to each other is sent to the external control circuit 9.

In this way, the housing 51 of the OP layer printer module 50 and the coupling body 25 of the print sheet winding module 20 can be joined with high positional accuracy.

Then, the print sheet feeding unit 17 is placed in the housing 11 of the print sheet feeding module 10. The print sheet winding unit 27 is placed in the housing 21 of the print sheet winding module 20. In this way, the printer system 1 is obtained (see FIG. 9).

Next, as illustrated in FIG. 6, the print sheet W is fed from the print sheet feeding unit 17 disposed in the housing 11 of the print sheet feeding module 10. The print sheet W passes the guide roller 18*a* and the nip roller 18*b* in the housing 11, is discharged through the opening 12*b* of the housing 11, is guided to the guide path 95 of the YMC printer module 30A, and enters the housing 31 of the YMC printer module 30A through the opening 32*a*.

The print sheet W sent into the housing 31 of the YMC printer module 30A sequentially passes the nip roller 92*a*, the guide roller 92*b*, and the guide path 95 and is then sent to a position between the thermal head 90 and the platen roller 91.

Similarly, the ink ribbon 39A is sent from the ink ribbon feeding unit 37A to a position between the thermal head 90 and the platen roller 91. In this case, the ink ribbon 39A has colors of yellow, magenta, and cyan.

Then, the print sheet W and the ink ribbon 39A are sandwiched between the thermal head 90 and the platen roller 91, and the ink ribbon 39 is thermally pressed against the print sheet W by the thermal head 90. In this way, the colors of yellow, magenta, and cyan of the ink ribbon 39A are thermally transferred onto the print sheet W by the thermal head 90 by a sublimation process.

Next, the print sheet W is discharged through the opening 32*b* from the housing 31 of the YMC printer module 30A, is guided to the guide path 95, and enters the housing 41 of the spot color printer module 40 through the opening 42*a*.

The print sheet W sent into the housing 41 of the spot color printer module 40 sequentially passes the nip roller 92*a*, the guide roller 92*b*, and the guide path 95 and is then sent to a position between the thermal head 90 and the platen roller 91.

Similarly, the ink ribbon 49 is sent from the ink ribbon feeding unit 47 to a position between the thermal head 90 and the platen roller 91. In this case, the ink ribbon 49 has a spot color other than YMC.

Then, the print sheet W and the ink ribbon 49 are sandwiched between the thermal head 90 and the platen roller 91, and the ink ribbon 49 is thermally pressed against the print sheet W by the thermal head 90. In this way, the spot color of the ink ribbon 49 is thermally transferred onto the print sheet W by the thermal head 90.

Next, the print sheet W is discharged through the opening 42*b* from the housing 41 of the spot color printer module 40, is guided to the guide path 95, and enters the housing 51 of the OP layer printer module 50 through the opening 52*a*.

The print sheet W sent into the housing 51 of the OP layer printer module 50 sequentially passes the nip roller 92*a*, the guide roller 92*b*, and the guide path 95 and is then sent to a position between the thermal head 90 and the platen roller 91.

Similarly, the ink ribbon 59 is sent from the ink ribbon feeding unit 57 to a position between the thermal head 90 and the platen roller 91. In this case, the ink ribbon 59 has an overcoat layer.

Then, the print sheet W and the ink ribbon 59 are sandwiched between the thermal head 90 and the platen roller 91, and the ink ribbon 59 is thermally pressed against the print sheet W by the thermal head 90. In this way, the overcoat layer (OP layer) of the ink ribbon 59 is thermally transferred onto the print sheet W by the thermal head 90.

In this way, the colors of yellow, magenta, and cyan, the spot color, and the overcoat layer are thermally transferred and printed onto an upper surface of the print sheet W.

In this way, the print sheet W on which printing has been performed by the thermal head 90 passes the nip roller 93*a*, the nip roller 93*b*, and the guide path 95 and is then sent to an outside of the housing 51 of the OP layer printer module 50 through the opening 52*b*.

Then, the print sheet W sent to the outside from the housing 51 of the OP layer printer module 50 enters the housing 21 through the opening 22*a* from the guide path 95 provided on the housing 21 of the print sheet winding module 20.

Next, the print sheet W sequentially passes the nip roller 28*a* and the guide roller 28*b* and is then wound by the print sheet winding unit 27 in the housing 21 of the print sheet winding module 20.

As described above, according to the present embodiment, the other surface 11*b* of the housing 11 of the print sheet feeding module 10 and the outer surface 35*a* of the coupling body 35 of the YMC printer module 30A are joined, and the insertion pins 13 of the housing 11 are inserted into the insertion holes 36 of the coupling body 35. This makes it possible to easily and accurately assemble the print sheet feeding module 10 and the YMC printer module 30A.

Similarly, the YMC printer module 30A and the spot color printer module 40 can be easily and accurately assembled, and the spot color printer module 40 and the OP layer printer module 50 can be easily and accurately assembled.

Finally, the other surface 51*b* of the housing 51 of the OP layer printer module 50 and the outer surface 25*a* of the coupling body 25 of the print sheet winding module 20 are joined, and the insertion pins 53 of the housing 51 are inserted into the insertion holes 26 of the coupling body 25. This makes it possible to easily and accurately assemble the OP layer printer module 50 and the print sheet winding module 20.

Furthermore, the coupling bodies 35, 45, 55, and 25, which have a smaller size than the housings 11, 31, 41, 51, and 21, are interposed between the housings 11, 31, 41, 51, and 21 of the modules 10, 30A, 40, 50, and 20, and heights of the coupling bodies 15, 35, 45, 55, and 25 are kept lower than heights of the housings 11, 31, 41, 51, and 21. Furthermore, the openings 12*a*, 12*b*, 32*a*, 32*b*, 42*a*, 42*b*, 52*a*, 52*b*, 22*a*, and 22*b* of the housings 11, 31, 41, 51, and 21 are disposed at positions higher than the coupling bodies 15, 35, 45, 55, and 25. With this configuration, regions above the coupling bodies 35, 45, 55, and 25 between the housings 11, 31, 41, 51, and 21 can be used as travelling regions where the print sheet W travels. Furthermore, a width of the whole printer system 10 in a direction orthogonal to the travelling direction of the print sheet W can be made uniform by making the widths of the housings 11, 31, 41, 51, and 21 identical to the widths of the coupling bodies 15, 35, 45, 55, and 25.

Third Embodiment

Next, a third embodiment of the present disclosure is described with reference to the drawings.

Figure 10:
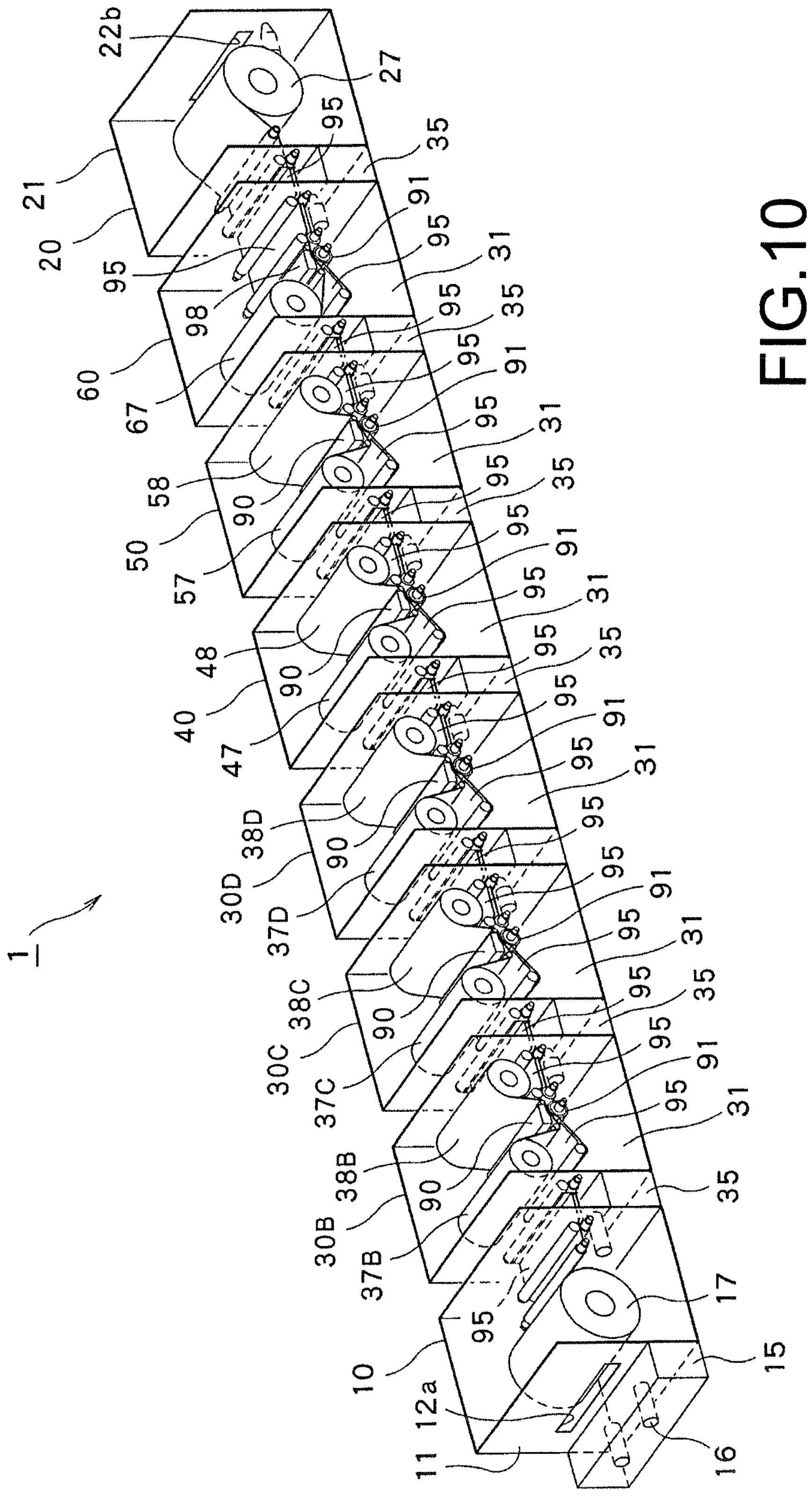
FIG. 10 is a schematic perspective view illustrating a printer system according to a third embodiment.
Figure 11:
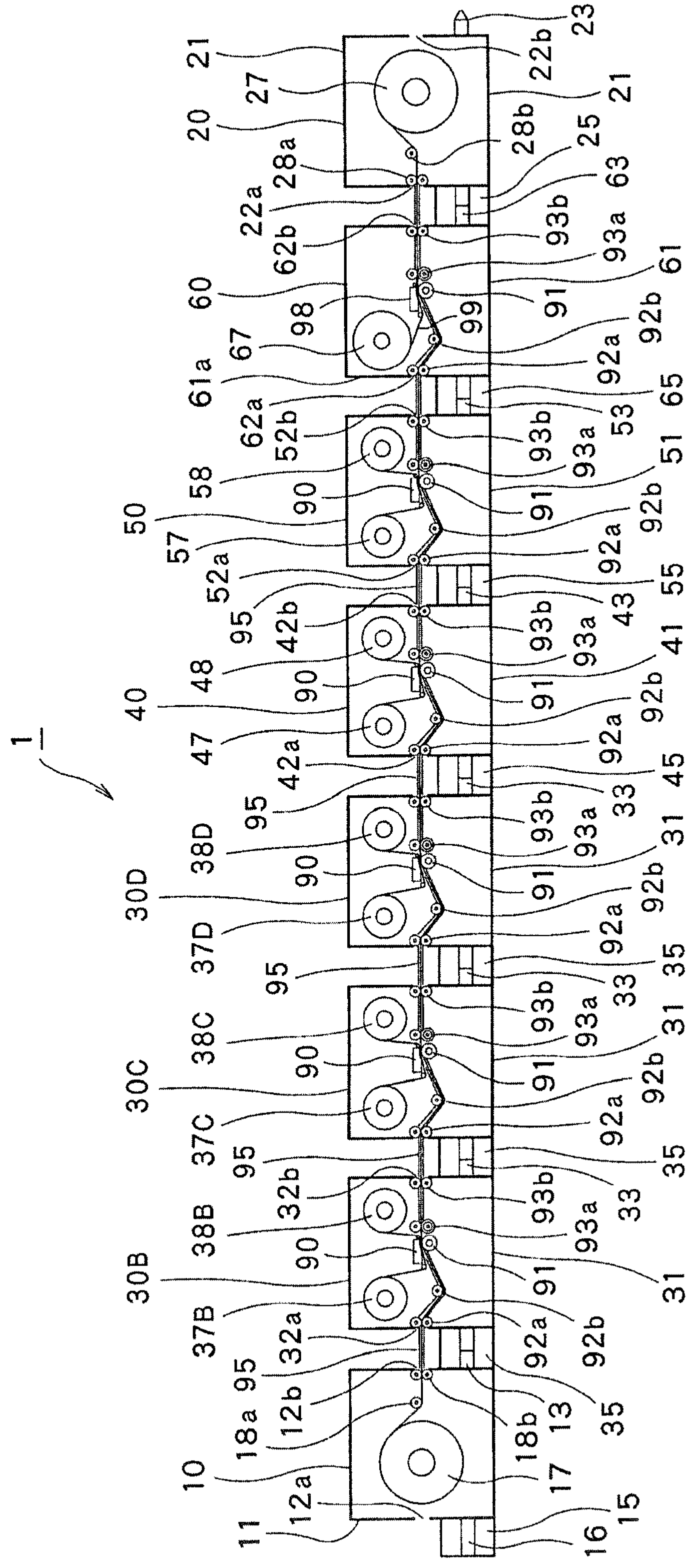
FIG. 11 is a side view illustrating the printer system according to the third embodiment.

FIGS. 10 and 11 illustrate the third embodiment of the present disclosure.

In the third embodiment illustrated in FIGS. 10 and 11, a first printer module 30B, a second printer module 30C, a third printer module 30D, a spot color printer module 40, an OP layer printer module 50, and a cover sheet attachment module 60 are disposed between a print sheet feeding module 10 and a print sheet winding module 20. The configuration except for this is substantially identical to the configuration of the first embodiment illustrated in FIGS. 1 to 5 and the configuration of the second embodiment illustrated in FIGS. 6 to 9.

In the third embodiment illustrated in FIGS. 10 and 11, parts identical to those in the first embodiment illustrated in FIGS. 1 to 5 and those in the second embodiment illustrated in FIGS. 6 to 9 are given identical reference signs, and detailed description thereof is omitted.

Note that in the third embodiment illustrated in FIGS. 10 and 11, the first printer module 30B prints a Y (yellow) color, the second printer module 30C prints an M (magenta) color, and the third printer module 30D prints a C (cyan) color.

The colors of Y, M, and C (yellow, magenta, and cyan) can be printed onto the print sheet W by the first printer module 30B, the second printer module 30C, and the third printer module 30D.

First, a printer system 1 according to the third embodiment is described with reference to FIGS. 10 and 11.

As illustrated in FIGS. 10 and 11, the printer system 1 includes eight modules 10, 30B, 30C, 30D, 40, 50, 60, and 20 that are successively disposed and are coupled to each other. Among these modules, the module 10 on an upstream side is a print sheet feeding module 10 that has a print sheet feeding function of feeding a roll-shaped print sheet W, and the module 20 on a downstream side is a print sheet winding module 20 that has a function of winding the print sheet W on which printing has been performed.

Furthermore, the first printer module 30B, the second printer module 30C, the third printer module 30D, the spot color printer module 40, and the OP layer printer module 50 that perform printing on the print sheet W and the cover sheet attachment module 60 that provides a cover sheet on the print sheet W are provided between the print sheet feeding module 10 and the print sheet winding module 20.

Among these modules, the print sheet feeding module 10 has a housing 11 and a print sheet feeding unit 17 provided in the housing 11, and the print sheet W fed from the print sheet feeding unit 17 is sent to the first printer module 30B through an opening 12*b* of an other surface 11*b*, which will be described later, while being guided by a guide roller 18*a* and a nip roller 18*b*.

The print sheet winding module 20 has a housing 21 and a print sheet winding unit 27 provided in the housing 21, and the print sheet W to which a cover sheet has been attached by the cover sheet attachment module 60 enters the print sheet winding module 20 through an opening 22*a* of one surface 21*a*, which will be described later, and this print sheet W is wound by the print sheet winding unit 27 while being guided by a nip roller 28*a* and a guide roller 28*b*.

Furthermore, the first printer module 30B, the second printer module 30C, and the third printer module 30D have substantially identical structures, and each have a housing 31, an ink ribbon feeding unit 37B, 37C, or 37D that is provided in the housing 31 and feeds an ink ribbon 39B, 39C, or 39D, and an ink ribbon winding unit 38B, 38C, or 38D that is provided in the housing 31 and winds the ink ribbon 39B, 39C, or 39D. Furthermore, a thermal head 90 and a platen roller 91 that sandwich the print sheet W and the ink ribbon 398, 39C, or 39D and perform printing on the print sheet W are provided in the housing 31.

Furthermore, a nip roller 92*a* and a guide roller 92*b* that guide, toward the thermal head 90, the print sheet W sent from the print sheet feeding module 10 are provided in each housing 31. Furthermore, the print sheet W on which printing has been performed by the thermal head 90 is discharged through an opening 32*b* of an other surface 31*b* of the housing 31 after passing a nip roller 93*a* and a nip roller 93*b*.

Furthermore, the housing 31 of each of the first printer module 30B, the second printer module 30C, and the third printer module 30D has, on one surface 31*a* of the housing 31, a guide path 95 that guides the print sheet W (see FIG. 10).

Furthermore, the guide path 95 that guides the print sheet W is also provided between the nip roller 92*a* and the guide roller 92*b*, between the guide roller 92*b* and the platen roller 91, and between the nip roller 93*a* and the nip roller 93*b* in the housing 31.

These guide paths 95 are supported in the housing 31 by a support mechanism (not illustrated).

The ink ribbon 39B fed from the ink ribbon feeding unit 37B provided in the first printer module 30B includes a yellow color.

The ink ribbon 39C fed from the ink ribbon feeding unit 37C provided in the second printer module 30C includes a magenta color.

Furthermore, the ink ribbon 39D fed from the ink ribbon feeding unit 37D provided in the third printer module 30D includes a cyan color.

Furthermore, the spot color printer module 40 has a housing 41, an ink ribbon feeding unit 47 that is provided in the housing 41 and feeds an ink ribbon 49, and an ink ribbon winding unit 48 that is provided in the housing 41 and winds the ink ribbon 49. Furthermore, a thermal head 90 and a platen roller 91 that sandwich the print sheet W and the ink ribbon 49 and perform printing on the print sheet W are provided in the housing 41.

Furthermore, a nip roller 92*a* and a guide roller 92*b* that guide, toward the thermal head 90, the print sheet W fed from the third printer module 30D are provided in the housing 41. Furthermore, the print sheet W on which printing has been performed by the thermal head 90 is discharged toward the OP layer printer module 50 through an opening 42*b* of an other surface 41*b* of the housing 41 after passing a nip roller 93*a* and a nip roller 93*b*.

Furthermore, the housing 41 of the spot color printer module 40 has, on one surface 41*a* of the housing 41, a guide path 95 that guides the print sheet W sent from the third printer module 30D (see FIG. 11).

Furthermore, the guide path 95 that guides the print sheet W is also provided between the nip roller 92*a* and the guide roller 92*b*, between the guide roller 92*b* and the platen roller 91, and between the nip roller 93*a* and the nip roller 93*b* in the housing 41.

These guide paths 95 are supported in the housing 41 by a support mechanism (not illustrated).

The ink ribbon 49 fed from the ink ribbon feeding unit 47 provided in the spot color printer module 40 includes a spot color other than yellow, magenta, and cyan.

Furthermore, the OP layer printer module 50 has a housing 51, an ink ribbon feeding unit 57 that is provided in the housing 51 and feeds the ink ribbon 59, and an ink ribbon winding unit 58 that is provided in the housing 51 and winds the ink ribbon 59. Furthermore, a thermal head 90 and a platen roller 91 that sandwich the print sheet W and the ink ribbon 59 and perform printing on the print sheet W are provided in the housing 51.

Furthermore, a nip roller 92*a* and a guide roller 92*b* that guide, toward the thermal head 90, the print sheet W fed from the spot color printer module 40 are provided in the housing 51.

Furthermore, the print sheet W on which printing has been performed by the thermal head 90 is discharged toward the cover sheet attachment module 60 through an opening 52*b* of an other surface 51*b* of the housing 51 after passing a nip roller 93*a* and a nip roller 93*b*.

Furthermore, the housing 51 of the OP layer printer module 50 has, on one surface 51*a* of the housing 51, a guide path 95 that guides the print sheet W sent from the spot color printer module 40 (see FIGS. 10 and 11).

Furthermore, the guide path 95 that guides the print sheet W is also provided between the nip roller 92*a* and the guide roller 92*b*, between the guide roller 92*b* and the platen roller 91, and between the nip roller 93*a* and the nip roller 93*b* in the housing 51.

These guide paths 95 are supported in the housing 51 by a support mechanism (not illustrated).

The ink ribbon 59 fed from the ink ribbon feeding unit 57 provided in the OP layer printer module 50 includes an overcoat layer (OP layer).

The cover sheet attachment module 60 has a housing 61 and a cover sheet feeding unit 67 that is provided in the housing 61 and feeds a cover sheet 99 to the print sheet W.

The cover sheet 99 fed from the cover sheet feeding unit 67 is sandwiched between a heating plate 98 and a platen roller 91 together with the print sheet W. Then, the cover sheet 99 is heated while being pressed by the heating plate 98 and is thus attached onto the print sheet W. The cover sheet 99 attached onto the print sheet W is attached onto the print sheet W in a weak adhesion state and functions as a protection sheet. For example, in a case where the print sheet W is used as a transfer sheet, the cover sheet 99 is peeled off from the print sheet W in a later step, and the print sheet W is transferred onto a target (not illustrated). Note that a nip roller 92*a* and a guide roller 92*b* that guide, toward the heating plate 98 and the platen roller 91, the print sheet W sent from the OP layer printer module 50 are disposed in the housing 61 of the cover sheet attachment module 60, and a nip roller 93*a* and a nip roller 93*b* that guide the print sheet W onto which the cover sheet 99 has been attached by the heating plate 98 and the platen roller 91 are disposed in the housing 61 of the cover sheet attachment module 60.

The print sheet W onto which the cover sheet 99 has been thus attached by the heating plate 98 is discharged toward the print sheet winding module 20 through an opening 62*b* of an other surface 61*b* of the housing 61 after passing the nip roller 93*a* and the nip roller 93*b*.

Furthermore, the housing 61 of the cover sheet attachment module 60 has, on one surface 61*a* of the housing 61, a guide path 95 that guides the print sheet W sent from the OP layer printer module 50 (see FIGS. 10 and 11).

Furthermore, the guide path 95 that guides the print sheet W is also provided between the nip roller 92*a* and the guide roller 92*b*, between the guide roller 92*b* and the platen roller 91, and between the nip roller 93*a* and the nip roller 93*b* in the housing 61.

These guide paths 95 are supported in the housing 61 by a support mechanism (not illustrated).

Next, structures of the print sheet feeding module 10, the first printer module 30B, the second printer module 30C, the third printer module 30D, the spot color printer module 40, the OP layer printer module 50, the cover sheet attachment module 60, and the print sheet winding module 20 are further described.

The print sheet feeding module 10 has the housing 11 having a rectangular parallelepiped shape as described above and has, on one surface 11*a* of the housing 11, a coupling body 15 having a rectangular parallelepiped shape that protrudes from the one surface 11*a*. One of an outer surface 15*a* of the coupling body 15 and the other surface 11*b* that is opposed to the one surface 11*a*, for example, the outer surface 15*a* of the coupling body 15 has two insertion holes 16 that are arranged in a horizontal direction. The other one of the outer surface 15*a* of the coupling body 15 and the other surface 11*b*, for example, the other surface 11*b* has two insertion pins 13 that are arranged in the horizontal direction and are to be inserted into insertion holes 36 of a coupling body 35 (later described) of the adjacent first printer module 30B.

The print sheet winding module 20 has the housing 21 having a rectangular parallelepiped shape as described above and has, on one surface 21*a* of the housing 21, a coupling body 25 having a rectangular parallelepiped shape that protrudes from the one surface 21*a*. One of an outer surface 25*a* of the coupling body 25 and the other surface 21*b* that is opposed to the one surface 21*a*, for example, the outer surface 25*a* of the coupling body 25 has two insertion holes 26 that are arranged in the horizontal direction. The other one of the outer surface 25*a* of the coupling body 25 and the other surface 21*b*, for example, the other surface 21*b* has two insertion pins 23 that are arranged in the horizontal direction.

The first printer module 30B, the second printer module 30C, and the third printer module 30D have substantially identical structures, and each have the housing 31 having a rectangular parallelepiped shape and has, on one surface 31*a* of the housing 31, a coupling body 35 having a rectangular parallelepiped shape that protrudes from the one surface 31*a*. One of an outer surface 35*a* of the coupling body 35 and the other surface 31*b* that is opposed to the one surface 31*a*, for example, the outer surface 35*a* of the coupling body 35 has two insertion holes 36 that are arranged in the horizontal direction. The other one of the outer surface 35*a* of the coupling body 35 and the other surface 35*b*, for example, the other surface 31*b* has two insertion pins 33 that are arranged in the horizontal direction and are to be inserted into insertion holes of an adjacent module.

The spot color printer module 40 has the housing 41 having a rectangular parallelepiped shape as described above and has, on one surface 41*a* of the housing 41, a coupling body 45 having a rectangular parallelepiped shape that protrudes from the one surface 41*a*. One of an outer surface 45*a* of the coupling body 45 and the other surface 41*b* that is opposed to the one surface 41*a*, for example, the outer surface 45*a* of the coupling body 45 has two insertion holes 46 that are arranged in the horizontal direction. The other one of the outer surface 45*a* of the coupling body 45 and the other surface 41*b*, for example, the other surface 41*b* has two insertion pins 43 that are arranged in the horizontal direction and are to be inserted into insertion holes 56 of a coupling body 55 of the adjacent OP layer printer module 50.

The OP layer printer module 50 has the housing 51 having a rectangular parallelepiped shape as described above and has, on one surface 51*a* of the housing 51, a coupling body 55 having a rectangular parallelepiped shape that protrudes from the one surface 51*a*. One of an outer surface 55*a* of the coupling body 55 and the other surface 51*b* that is opposed to the one surface 51*a*, for example, the outer surface 55*a* of the coupling body 55 has two insertion holes 56 that are arranged in the horizontal direction. The other one of the outer surface 55*a* of the coupling body 55 and the other surface 51*b*, for example, the other surface 51*b* has two insertion pins 53 that are arranged in the horizontal direction and are to be inserted into insertion holes 66 of a coupling body 65 of the adjacent cover sheet attachment module 60.

The cover sheet attachment module 60 has the housing 61 having a rectangular parallelepiped shape and has, on one surface 61*a* of the housing 61, a coupling body 65 having a rectangular parallelepiped shape that protrudes from the one surface 61*a*. One of an outer surface 65*a* of the coupling body 65 and the other surface 61*b* that is opposed to the one surface 61*a*, for example, the outer surface 65*a* of the coupling body 65 has two insertion holes 66 that are arranged in the horizontal direction. The other one of the outer surface 65*a* of the coupling body 65 and the other surface 61*b*, for example, the other surface 61*b* has two insertion pins 63 that are arranged in the horizontal direction and are to be inserted into the insertion holes 26 of the coupling body 25 of the adjacent print sheet winding module 20.

In the present embodiment, the housing 11 of the print sheet feeding module 10 has a rectangular parallelepiped shape and has a larger size than the coupling body 15 that also has a rectangular parallelepiped shape. The coupling body 15 has a substantially identical width to the housing 11 and has a height that is approximately ¼ to ½ of a height of the housing 11. The width of the coupling body 15 and the width of the housing 11 are widths along a direction orthogonal to a travelling direction of the print sheet W.

The housing 21 of the print sheet winding module 20 has a rectangular parallelepiped shape and has a larger size than the coupling body 25 that also has a rectangular parallelepiped shape. The coupling body 25 has a substantially identical width to the housing 21 and has a height that is approximately ¼ to ½ of a height of the housing 21. The width of the coupling body 25 and the width of the housing 21 are widths along the direction orthogonal to the travelling direction of the print sheet W.

Each of the housings 31 of the first printer module 30B, the second printer module 30C, and the third printer module 30D has a rectangular parallelepiped shape and has a larger size than the coupling body 35 that also has a rectangular parallelepiped shape. The coupling body 35 has a substantially identical width to the housing 31 and has a height that is approximately ¼ to ½ of a height of the housing 31. The width of the coupling body 35 and the width of the housing 31 are widths along the direction orthogonal to the travelling direction of the print sheet W.

The housing 41 of the spot color printer module 40 has a rectangular parallelepiped shape and has a larger size than the coupling body 45 that also has a rectangular parallelepiped shape. The coupling body 45 has a substantially identical width to the housing 41 and has a height that is approximately ¼ to ½ of a height of the housing 41. The width of the coupling body 45 and the width of the housing 41 are widths along the direction orthogonal to the travelling direction of the print sheet W.

The housing 51 of the OP layer printer module 50 has a rectangular parallelepiped shape and has a larger size than the coupling body 55 that also has a rectangular parallelepiped shape. The coupling body 55 has a substantially identical width to the housing 51 and has a height that is approximately ¼ to ½ of a height of the housing 51. The width of the coupling body 55 and the width of the housing 51 are widths along the direction orthogonal to the travelling direction of the print sheet W.

The housing 61 of the cover sheet attachment module 60 has a rectangular parallelepiped shape and has a larger size than the coupling body 65 that also has a rectangular parallelepiped shape. The coupling body 65 has a substantially identical width to the housing 61 and has a height that is approximately ¼ to ½ of a height of the housing 61. The width of the coupling body 65 and the width of the housing 61 are widths along the direction orthogonal to the travelling direction of the print sheet W.

Furthermore, the one surface 11*a* and the other surface 11*b* of the housing 11 of the print sheet feeding module 10 have, above the coupling body 15, openings 12*a* and 12*b* through which the print sheet W passes, respectively. A first contact point 81*a* is provided on the other surface 11*b* of the housing 11, and a second contact point 81*b* is provided on the outer surface 15*a* of the coupling body 15.

The one surface 21*a* and the other surface 21*b* of the housing 21 of the print sheet winding module 20 have, above the coupling body 25, openings 22*a* and 22*b* through which the print sheet W passes, respectively. A first contact point 81*a* is provided on the other surface 21*b* of the housing 21, and a second contact point 81*b* that is electrically connected to the first contact point 81*a* of the adjacent cover sheet attachment module 60 is provided on the outer surface 25*a* of the coupling body 25.

Furthermore, the one surface 31*a* and the other surface 31*b* of each of the housings 31 of the first printer module 30B, the second printer module 30C, and the third printer module 30D have, above the coupling body 35, openings 32*a* and 32*b* through which the print sheet W passes, respectively. A first contact point 81*a* is provided on the other surface 31*b* of the housing 31. A second contact point 81*b* that is electrically connected to a first contact point 81*a* of an adjacent module is provided on the outer surface 35*a* of the coupling body 35.

Furthermore, the one surface 41*a* and the other surface 41*b* of the housing 41 of the spot color printer module 40 have, above the coupling body 45, openings 42*a* and 42*b* through which the print sheet W passes, respectively. A first contact point 81*a* is provided on the other surface 41*b* of the housing 41. A second contact point 81*b* that is electrically connected to the first contact point 81*a* of the adjacent third printer module 30D is provided on the outer surface 45*a* of the coupling body 45.

Furthermore, the one surface 51*a* and the other surface 51*b* of the housing 51 of the OP layer printer module 50 have, above the coupling body 55, openings 52*a* and 52*b* through which the print sheet W passes, respectively. A first contact point 81*a* is provided on the other surface 51*b* of the housing 51. A second contact point 81*b* that is electrically connected to the first contact point 81*a* of the adjacent spot color printer module 40 is provided on the outer surface 55*a* of the coupling body 55.

Furthermore, the one surface 61*a* and the other surface 61*b* of the housing 61 of the cover sheet attachment module 60 have, above the coupling body 65, openings 62*a* and 62*b* through which the print sheet W passes, respectively. A first contact point 81*a* is provided on the other surface 61*b* of the housing 61. A second contact point 81*b* that is electrically connected to the first contact point 81*a* of the adjacent OP layer printer module 50 is provided on the outer surface 65*a* of the coupling body 65.

It is preferable that the housing 11 and the coupling body 15 of the print sheet feeding module 10, the housing 21 and the coupling body 25 of the print sheet winding module 20, the housings 31 and the coupling bodies 35 of the first printer module 30B, the second printer module 30C, and the third printer module 30D, the housing 41 and the coupling body 45 of the spot color printer module 40, the housing 51 and the coupling body 55 of the OP layer printer module 50, and the housing 61 and the coupling body 65 of the cover sheet attachment module 60 have identical external shapes and identical structures. In a case where the housing 11 and the coupling body 15 of the print sheet feeding module 10, the housing 21 and the coupling body 25 of the print sheet winding module 20, the housings 31 and the coupling bodies 35 of the first printer module 30B, the second printer module 30C, and the third printer module 30D, the housing 41 and the coupling body 45 of the spot color printer module 40, the housing 51 and the coupling body 55 of the OP layer printer module 50, and the housing 61 and the coupling body 65 of the cover sheet attachment module 60 have identical external shapes and identical structures, the modules 10, 20, 30B, 30C, 30D, 40, 50, and 60 can be easily produced by using housings and coupling bodies having identical external shapes and identical structures and disposing internal structures corresponding to the respective modules in the housings.

Next, working of the present embodiment having such a configuration is described.

First, as illustrated in FIGS. 10 and 11, the print sheet feeding module 10, the print sheet winding module 20, the first printer module 30B, the second printer module 30C, the third printer module 30D, the spot color printer module 40, the OP layer printer module 50, and the cover sheet attachment module 60 are prepared.

Next, as illustrated in FIGS. 10 and 11, the other surface 11*b* of the housing 11 of the print sheet feeding module 10 and the outer surface 35*a* of the coupling body 35 of the first printer module 30B are joined. At this time, the insertion pins 13 of the housing 11 of the print sheet feeding module 10 are inserted into the insertion holes 36 of the coupling body 35 of the first printer module 30B.

Furthermore, the first contact point 81*a* of the housing 11 of the print sheet feeding module 10 is electrically connected to the second contact point 81*b* of the coupling body 35 of the first printer module 30B. Information indicating that the first contact point 81*a* and the second contact point 81*b* have been connected to each other is sent to an external control circuit 9.

In this way, the housing 11 of the print sheet feeding module 10 and the coupling body 35 of the first printer module 30B can be joined with high positional accuracy.

Similarly, the first printer module 30B, the second printer module 30C, the third printer module 30D, the spot color printer module 40, the OP layer printer module 50, and the cover sheet attachment module 60 are sequentially joined.

Finally, the other surface 61*b* of the housing 61 of the cover sheet attachment module 60 and the outer surface 25*a* of the coupling body 25 of the print sheet winding module 20 are joined. At this time, the insertion pins 63 of the housing 61 of the cover sheet attachment module 60 are inserted into the insertion holes 26 of the coupling body 25 of the print sheet winding module 20.

Furthermore, the first contact point 81*a* of the housing 61 of the cover sheet attachment module 60 is electrically connected to the second contact point of the coupling body 25 of the print sheet winding module 20, and information indicating that the first contact point 81*a* and the second contact point 81*b* have been connected to each other is sent to the external control circuit 9.

In this way, the housing 61 of the cover sheet attachment module 60 and the coupling body 25 of the print sheet winding module 20 can be joined with high positional accuracy.

In this way, the printer system 1 can be obtained (see FIGS. 10 and 11).

Next, as illustrated in FIGS. 10 and 11, the print sheet W is fed from the print sheet feeding unit 17 disposed in the housing 11 of the print sheet feeding module 10. The print sheet W passes the guide roller 18*a* and the nip roller 18*b* in the housing 11, is discharged through the opening 12*b* of the housing 11, is guided to the guide path 95 of the first printer module 30B, and enters the housing 31 of the first printer module 30B through the opening 32*a*.

The print sheet W sent into the housing 31 of the first printer module 30B sequentially passes the nip roller 92*a*, the guide roller 92*b*, and the guide path 95 and is then sent to a position between the thermal head 90 and the platen roller 91.

Similarly, the ink ribbon 39B is sent from the ink ribbon feeding unit 37B to a position between the thermal head 90 and the platen roller 91. In this case, the ink ribbon 39B has a yellow color.

Then, the print sheet W and the ink ribbon 39B are sandwiched between the thermal head 90 and the platen roller 91, and the ink ribbon 39 is thermally pressed against the print sheet W by the thermal head 90. In this way, the yellow color of the ink ribbon 39B is thermally transferred onto the print sheet W by the thermal head 90 by a sublimation process.

Then, the print sheet W enters the second printer module 30C, and a magenta color is printed onto the print sheet W in the second printer module 30C through similar steps to the first printer module 30B.

Next, the print sheet W enters the third printer module 30D, and a cyan color is printed onto the print sheet W in the third printer module 30D through similar steps to the first printer module 30B. Next, the print sheet W is discharged from the housing 31 of the third printer module 30D through the opening 32*b*, is guided to the guide path 95, and enters the housing 41 of the spot color printer module 40 through the opening 42*a*.

The print sheet W sent into the housing 41 of the spot color printer module 40 sequentially passes the nip roller 92*a*, the guide roller 92*b*, and the guide path 95 and is then sent to a position between the thermal head 90 and the platen roller 91.

Similarly, the ink ribbon 49 is sent from the ink ribbon feeding unit 47 to a position between the thermal head 90 and the platen roller 91. In this case, the ink ribbon 49 has a spot color other than Y, M, and C.

Then, the print sheet W and the ink ribbon 49 are sandwiched between the thermal head 90 and the platen roller 91, and the ink ribbon 49 is thermally pressed against the print sheet W by the thermal head 90. In this way, the spot color of the ink ribbon 49 is thermally transferred onto the print sheet W by the thermal head 90.

Next, the print sheet W is discharged from the housing 41 of the spot color printer module 40 through the opening 42*b*, is guided to the guide path 95, and enters the housing 51 of the OP layer printer module 50 through the opening 52*a*.

The print sheet W sent into the housing 51 of the OP layer printer module 50 sequentially passes the nip roller 92*a*, the guide roller 92*b*, and the guide path 95 and is then sent to a position between the thermal head 90 and the platen roller 91.

Similarly, the ink ribbon 59 is sent from the ink ribbon feeding unit 57 to a position between the thermal head 90 and the platen roller 91. In this case, the ink ribbon 59 has an overcoat layer.

Then, the print sheet W and the ink ribbon 59 are sandwiched between the thermal head 90 and the platen roller 91, and the ink ribbon 59 is thermally pressed against the print sheet W by the thermal head 90. In this way, the overcoat layer (OP layer) of the ink ribbon 59 is thermally transferred onto the print sheet W by the thermal head 90.

In this way, the yellow, magenta, and cyan colors, the spot color, and the overcoat layer are thermally transferred and printed onto an upper surface of the print sheet W.

Next, the print sheet W is discharged from the housing 51 of the OP layer printer module 50 through the opening 52*b* and enters the housing 61 of the cover sheet attachment module 60 through the opening 62*a* after passing the guide path 95. The print sheet W sent into the housing 61 of the cover sheet attachment module 60 is sent toward the heating plate 98. Concurrently, the cover sheet 99 is fed from the cover sheet feeding unit 67 onto the print sheet W, and the print sheet W and the cover sheet 99 are sandwiched between the heating plate 98 and the platen roller 91. Next, the cover sheet 99 is heated while being pressed by the heating plate 98 and is thus attached onto the print sheet W.

The cover sheet 99 protects the print sheet W, and is peeled off from the print sheet W in a later step in a case where the print sheet W is used as a transfer sheet. The print sheet W from which the cover sheet 99 has been peeled off is transferred onto a target material (not illustrated).

The print sheet W onto which the cover sheet 99 has been thus attached is sent to an outside from the housing 61 of the cover sheet attachment module 60.

Then, the print sheet W sent to the outside from the housing 61 of the cover sheet attachment module 60 enters the housing 21 through the opening 20*a* from the guide path 95 provided on the housing 21 of the print sheet winding module 20.

Next, the print sheet W sequentially passes the nip roller 28*a* and the guide roller 28*b* in the housing 21 of the print sheet winding module 20 and is then wound by the print sheet winding unit 27.

As described above, according to the present embodiment, the other surface 11*b* of the housing 11 of the print sheet feeding module 10 and the outer surface 35*a* of the coupling body 35 of the first printer module 30B are joined, and the insertion pins 13 of the housing 11 are inserted into the insertion holes 36 of the coupling body 35. This makes it possible to easily and accurately assemble the print sheet feeding module 10 and the first printer module 30B.

Similarly, the second printer module 30C, the third printer module 30D, the spot color printer module 40, the OP layer printer module 50, and the cover sheet attachment module 60 can be sequentially assembled easily and accurately with the first printer module 30B.

Finally, the other surface 61*b* of the housing 61 of the cover sheet attachment module 60 and the outer surface 25*a* of the coupling body 25 of the print sheet winding module 20 are joined, and the insertion pins 33 of the housing 61 are inserted into the insertion holes 26 of the coupling body 25. This makes it possible to easily and accurately assemble the cover sheet attachment module 60 and the print sheet winding module 20.

Furthermore, the coupling bodies 35, 45, 55, 65, and 25, which have a smaller size than the housings 11, 31, 41, 51, 61, and 21, are interposed between the housings 11, 31, 41, 51, 61, and 21 of the modules 10, 30, 40, 50, 60, and 20, and heights of the coupling bodies 15, 35, 45, 55, 65, and 25 are kept lower than heights of housings 11, 31, 41, 51, 61, and 21. Furthermore, the openings 12*a*, 12*b*, 32*a*, 32*b*, 42*a*, 42*b*, 52*a*, 52*b*, 62*a*, 22*a*, and 22*b* of the housings 11, 31, 41, 51, 61, and 21 are disposed at positions higher than the coupling bodies 15, 35, 45, 55, 65, and 25. With this configuration, regions above the coupling bodies 35, 45, 55, 65, and 25 between the housings 11, 31, 41, 51, 61, and 21 can be used as travelling regions where the print sheet W travels. Furthermore, a width of the whole printer system 10 in a direction orthogonal to the travelling direction of the print sheet W can be made uniform by making the widths of the housings 11, 31, 41, 51, 61, and 21 identical to the widths of the coupling bodies 15, 35, 45, 65, and 25.

REFERENCE SIGNS LIST

1 printer system
9 control circuit
10 print sheet feeding module
11 housing
11*a* one surface
11*b* other surface
12*a* opening
12*b* opening
13 insertion pin
15 coupling body
16 insertion hole
17 print sheet feeding unit
18*a* guide roller
18*b* nip roller
20 print sheet winding module
21 housing
21*a* one surface
21*b* other surface
22*a* opening
22*b* opening
23 insertion pin
25 coupling body
26 insertion hole
27 print sheet winding unit
28*a* nip roller
28*b* guide roller
30 printer module
30A YMC printer module
308 first printer module
30C second printer module
30D third printer module
31 housing
31*a* one surface
31*b* other surface
32*a* opening
32*b* opening
33 insertion pin
35 coupling body
36 insertion hole
40 spot color printer module
41 housing

41*a* one surface
41*b* other surface
42*a* opening
42*b* opening
43 insertion pin
45 coupling body
46 insertion hole
50 OP layer printer module
51 housing
51*a* one surface
51*b* other surface
52*a* opening
52*b* opening
53 insertion pin
55 coupling body
56 insertion hole
60 cover sheet attachment module
61 housing
61*a* one surface
61*b* other surface
62*a* opening
62*b* opening
63 insertion pin
65 coupling body
66 insertion hole
90 thermal head
91 platen roller
92*a* nip roller
92*b* guide roller
93*a* nip roller
93*b* nip roller
95 guide path

The invention claimed is:

1. A printer system comprising three or more modules that are successively disposed and are coupled to each other, wherein a module on an upstream side has a print sheet feeding function of feeding a print sheet, a module on a downstream side has a print sheet winding function of winding the print sheet, another module includes a printer module that performs printing on the print sheet, and each of the modules has a housing and has, on one surface of the housing, a coupling body that protrudes from the one surface and has a smaller size than the housing, between the neighboring modules coupled to each other, the other surface of the housing of one module is coupled to the outer surface of the coupling body of the other module, wherein each of the modules includes a coupling body on only one side of the module and an insertion pin on the housing on the opposite side of the module, and wherein each of the coupling bodies face in the same direction and each of the insertion pins face in the same and opposite direction with respect to the coupling bodies.

2. The printer system according to claim 1, wherein one of an outer surface of the coupling body has an insertion hole, and the other one of the outer surface of the housing has the insertion pin to be inserted into the insertion hole of an adjacent module.

3. The printer system according to claim 2, wherein a plurality of insertion pins that are arranged in a horizontal direction and a plurality of insertion holes that are arranged in a horizontal direction are provided as the insertion pin and the insertion hole of each of the modules.

4. The printer system according to claim 1, wherein a travelling region where the print sheet travels is formed in a region other than the coupling body between the housings of the modules.

5. The printer system according to claim 4, wherein a height of the coupling body of each of the modules is ¼ to ½ of a height of the housing.

6. The printer system according to claim 4, wherein a width of the coupling body of each of the modules is identical to a width of the housing.

7. The printer system according to claim 4, wherein a guide path for the print sheet is provided in the travelling region between the housings.

8. The printer system according to claim 1, wherein a plural other modules are provided and include a cover sheet attachment module that is located on a downstream side relative to the printer module and provides a cover sheet onto the print sheet.

9. The printer system according to claim 1, wherein a plurality of printer modules are provided as the printer module.

10. The printer system according to claim 1, wherein the one surface and the other surface of the housing of each of the modules has an opening through which the print sheet passes.

11. The printer system according to claim 1, wherein a first contact point is provided on one of the outer surface of the coupling body and the other surface of the housing, and a second contact point that is electrically connected to the first contact point of an adjacent module is provided on the other one of the outer surface of the coupling body and the other surface of the housing.

12. A printer system comprising three or more modules that are successively disposed and are coupled to each other, wherein a module on an upstream side has a print sheet feeding function of feeding a print sheet, a module on a downstream side has a print sheet winding function of winding the print sheet, another module includes a printer module that performs printing on the print sheet, and each of the modules has a housing and has, on one surface of the housing, a coupling body that protrudes from the one surface and has a smaller size than the housing, between the neighboring modules coupled to each other, the other surface of the housing of one module is coupled to the outer surface of the coupling body of the other module, the one surface and the other surface of the housing of each of modules have an opening through which the print sheet passes, and between the neighboring modules coupled to each other, the module on a downstream side has a guide path extending from the opening of the one of the surface of the housing to the module on an upstream side, including a couple of plates for guiding the print sheet, wherein each of the modules includes a coupling body on only one side of the module and an insertion pin on the housing on the opposite side of the module, and wherein each of the coupling bodies face in the same direction and each of the insertion pins face in the same and opposite direction with respect to the coupling bodies.

* * * * *